(12) United States Patent
Saurav et al.

(10) Patent No.: US 11,042,790 B2
(45) Date of Patent: Jun. 22, 2021

(54) METHODS AND SYSTEMS FOR HANDLING PRINTING OF LARGE-SIZE OBJECTS

(71) Applicant: XEROX CORPORATION, Norwalk, CT (US)

(72) Inventors: Amit Saurav, Patna (IN); Nagarajan Narasimhan, Chennai (IN); Sivaprakash Ramasethu, Kanchipuram (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/171,395

(22) Filed: Oct. 26, 2018

(65) Prior Publication Data

US 2020/0134405 A1  Apr. 30, 2020

(51) Int. Cl.
*G06K 15/02* (2006.01)
*G06F 3/12* (2006.01)

(52) U.S. Cl.
CPC ....... *G06K 15/1848* (2013.01); *G06F 3/1237* (2013.01)

(58) Field of Classification Search
None
See application file for complete search history.

(56) References Cited

U.S. PATENT DOCUMENTS

| 5,311,259 A | * | 5/1994 | Moriya | G03G 15/5095 358/1.2 |
| 6,857,798 B2 | * | 2/2005 | Matsuyama | B41J 11/0065 101/484 |
| 2002/0025175 A1 | * | 2/2002 | Sato | B65H 43/00 399/16 |
| 2002/0044298 A1 | * | 4/2002 | Kaneko | H04N 1/32507 358/1.15 |
| 2014/0063512 A1 | * | 3/2014 | Takeuchi | G06K 15/1843 358/1.2 |

FOREIGN PATENT DOCUMENTS

JP  09-052392 A  *  2/1997

* cited by examiner

*Primary Examiner* — Fan Zhang
(74) *Attorney, Agent, or Firm* — Jones Robb, PLLC

(57) ABSTRACT

Described herein are methods and devices for printing a large-size object on multiple sheets. The method includes receiving, at a printing device, a print job submitted by a user, wherein the print job includes a large-size object. The large-size object present in the print job is processed by the printing device to ascertain the number and sizes of sheets required for printing the large-size object. Then, the large-size object is printed by the printing device on multiple sheets based on the ascertainment.

18 Claims, 14 Drawing Sheets

METHODS AND SYSTEMS FOR HANDLING PRINTING OF LARGE-SIZE OBJECTS

TECHNICAL FIELD

The present disclosure relates generally to printing technology and more particularly to methods and systems for printing a large-size object on multiple sheets pre-loaded in a printing device.

BACKGROUND

Background description includes information that may be useful in understanding the present disclosure. It is not an admission that any of the information provided herein is prior art or relevant to the presently claimed disclosure, or that any publication specifically or implicitly referenced is prior art.

Large-size objects, such as posters or banners, are commonly utilized for any number of reasons, for example, for announcing a birthday, the arrival of a baby, an outdoor event at a park, a meeting, and so forth. Generally, the large-size objects have a size that is larger than a standard paper/sheet such as A3, A4, or legal size in a printer. Accordingly, a user desiring to print such a large-size object has a couple of options.

One option is to have the object printed professionally using large commercial printers. However, this may involve a cost and a turn-around time that is sometimes not acceptable to the user. Another option is to print the large-size object using small printers, i.e., printers typically used in homes or offices. However, printing the large-size object requires huge scaling the object and thus, the printed large-size object is not of desired size or quality. Also, some small printers cannot print over the entire extent of a sheet (i.e., the edges of the sheet are left blank), so a person may need to cut off the unprinted edges manually. Overall, printing of the large-size object using existing solutions do not yield the desired results. Therefore, there is a need for improved methods and systems to print the large-size object.

SUMMARY

This summary is provided to introduce concepts related to printing of a large-size object onto multiple sheets pre-loaded in a printing device. The concepts are further described below in the detailed description. This summary is not intended to identify key features or essential features of the claimed subject matter, nor is it intended to be used to limit the scope of the claimed subject matter.

A method for handling printing of a large-size object at a printing device is disclosed. The method includes receiving, at the printing device, a print job including a large-size object. The large-size object is processed by the printing device, to ascertain the sizes of sheets and the corresponding number of the sheets required for printing the large-size object, wherein the processing includes: dividing the large-size object into N×N spatial segments of equal size, wherein N is numeric value equal to or greater than 8; measuring the size of a single spatial segment; identifying different sizes of sheets pre-loaded in the printing device; and comparing the measured size of the single spatial segment with the different sizes of sheets pre-loaded in the printing device. Based on the comparison, performing one or more of the following ascertaining a number of largest size sheets that map with a maximum number of spatial segments out of the N×N spatial segments, or ascertaining a number of second largest size of sheets to map on un-mapped spatial segments, or ascertaining a number of the second largest size sheets and smallest size sheets, to map on the un-mapped spatial segments, or ascertaining a number of individual sheets having size matching to map on the un-mapped spatial segments, when the number of the largest size sheets, the second largest size sheets, and the smallest size sheets fails to map all the un-mapped spatial segments. Finally, the large-size object is printed, by the printing device, on multiple sheets based on the ascertainment.

A method includes receiving a print job at a printing device, the print job includes an object. The size of the object is measured. Then, sheets pre-loaded in the printing device are identified. Based on the pre-loaded sheets in the printing device, it is determined whether the object is a large-size object. The large-size object is further processed in the following manner dividing the large-size object into N×N spatial segments of equal size; calculating the number of spatial segments to be printed on a single largest size sheet and the number of the largest size sheets required to print the maximum number of spatial segments; identifying the remaining spatial segments of the large-size object; and identifying other loaded sheets and the corresponding number of other loaded sheets required to print the remaining spatial segments of the large-size object. Based on the calculation and identification, the complete large-size object is printed on multiple sheets pre-loaded in the printing device, without scaling the large-size object.

A printing device for printing a large-size object on multiple sheets is disclosed. The printing device includes a processor to receive a print job submitted by a user, wherein the print job includes an instruction to print the large-size object in a large format printing mode; divide the large-size object into N×N spatial segments of equal size, wherein N is numeric value equal to or more than 8; measure the size of a single spatial segment to calculate the size of the large-size object; compare the measured size of the single spatial segment with different sizes of sheets pre-loaded in the printing device. Based on the comparison, ascertain one or more of the following a number of largest size sheets that map with a maximum number of spatial segments out of the N×N spatial segments, or a number of second largest size sheets to map on un-mapped spatial segments, or a number of the second largest size sheets and smallest size sheets, to map on un-mapped spatial segments, or a number of individual sheets having size matching to map on the un-mapped spatial segments, when the number of the second largest size sheets and the smallest size sheets fails to map all the un-mapped spatial segments; and print the large-size object on multiple sheets based on the one or more ascertainments.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1A illustrates a physical printing device, while

DESCRIPTION

Figure 1A:
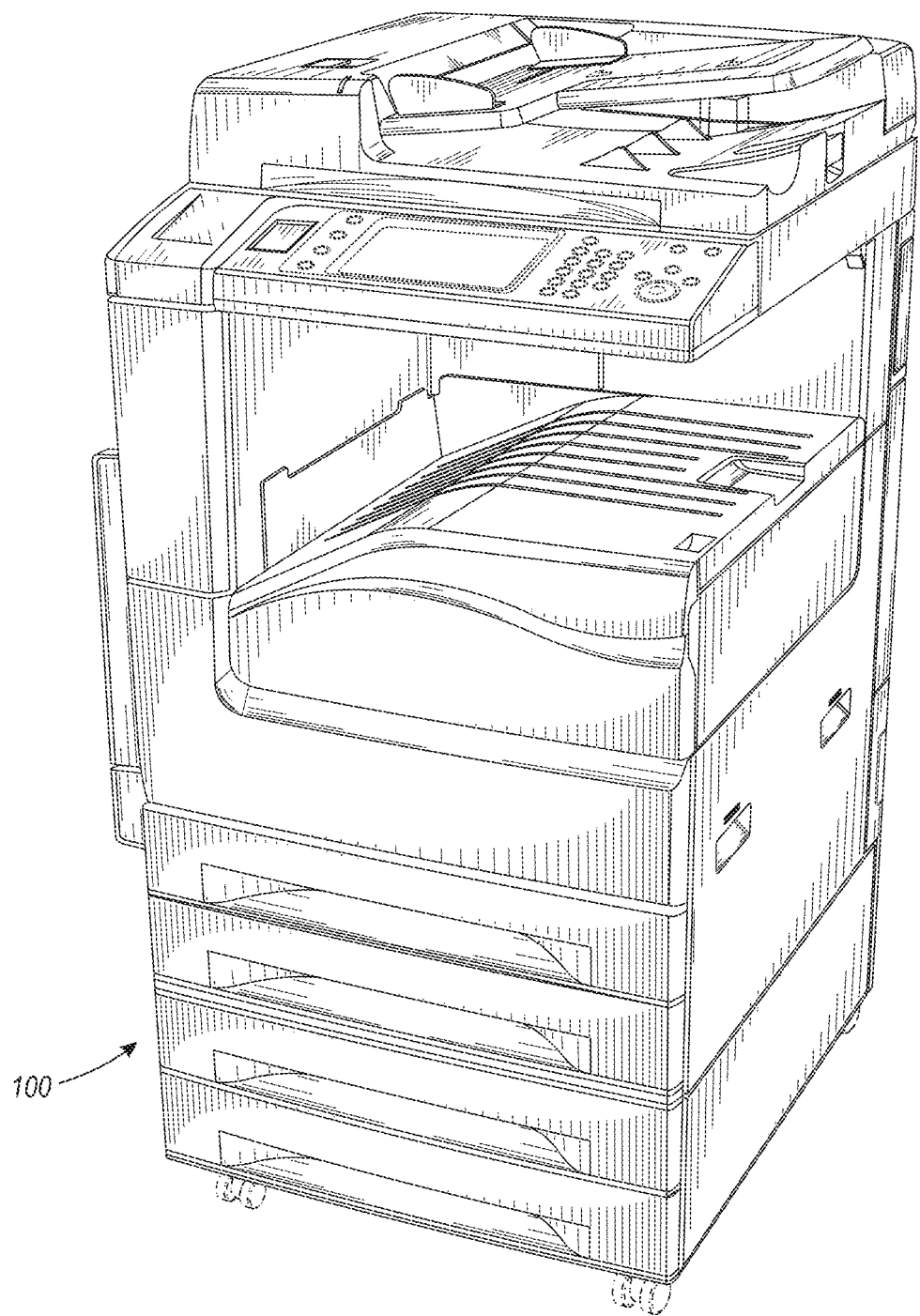

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

"Printing device" may be defined as including, but not necessarily limited to, a peripheral that produces a representation of a document on one or both sides of media such as paper, transparency, fabric, etc. The printing device can be a single function device or a multi-function device (e.g., including scanning, faxing, or other functionality) having multiple feeding trays capable of short edge feed (SEF) and large edge feed (LEF). The printing device generally prints a job including an object as received from a user. In context of the present disclosure, the printing device handles printing of a large-size object such that the large-size object is printed on a combination of multiple sheets available in the printing device, without scaling the object.

The term "Short Edge Feed" (SEF) refers to printing process where the shorter edge of a sheet is the first edge to touch a feeder roller of the printing device while feeding. For example, 8.5-inch side represents SEF, of the 8.5×11 inches paper size.

The term "Long Edge Feed" (LEF) refers to the printing process where the longer edge of a sheet is the first edge to touch a feeder roller of the printing device while feeding. For example, 11-inch side represents LEF, of the 8.5×11 inches paper size.

"Large-size object" refers to an object having a size that is larger than a standard paper/sheet such as A3, or A4 or any other sheets typically loaded in the printing device, for example, a home printer. The large-size object may be text, image, graphics or a combination thereof. The large-size object is a part of document submitted by a user for printing. The document may be referred to a print job when received by the printing device. The large-size object may also be termed as "large-size print job."

"Sheets" refer to standard sheets available in the printing device. Various examples of the standard sheets pre-loaded or available with the printing device include A3, A4, A2, A1, and so on. The size of the sheets is measured in width and height and the same can be measured in millimeters or inches. The sheet may be termed as "stock," "media," or "paper." The sheets available in the printing device may be termed as pre-loaded sheets or loaded sheets in the printing device. One example of sheet may be a paper sheet but other examples of available sheets or later developed can also be implemented.

The term "largest size sheets" refer to the sheets having the maximum size (i.e., width and height) of the various sheets pre-loaded in the printing device. The second largest size sheets include the sheets largest in size (i.e., width and height) after the largest size sheet. The smallest size sheets include sheets having the smallest size (i.e., width and height) of all the sheets pre-loaded in the printing device. Considering if the printing device includes A3, A2 and A4 sheets as pre-loaded sheets, then A2 is the largest size sheet, A3 is the second largest size sheet and A4 being the smallest size sheet.

The term "large format printing mode" indicates a mode in which the large-size object is to be printed on multiple sheets pre-loaded in the printing device.

"User device" is defined as including, but not necessarily limited to, hardware, software, or a combination thereof that accesses a server. Examples include, but are not limited to, a computing device, a phone, a tablet, or a personal digital assistant. The user device may be termed as a "client device."

"Computer-readable medium" or "storage medium" may be a physical medium that can store data. Examples of "computer-readable medium" may include a magnetic medium such as diskettes, floppy disks, and tape; an optical medium such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be storage medium.

Overview

In the large-size object printing, printouts have sizes many times larger than a standard paper such as a letter or A4 size sheet loaded in a printer. Various examples of large-size object printing include poster printing, wallpaper printing, billboard printing, and so on. High-quality printouts are desired for such large-size object printing. The large-size object printing requires large size/format papers and sophisticated large printers to print. However, this may involve a cost and a turn-around time that is not acceptable to users. A few solutions exist in the market to print the large-size object using the available sheets but those solutions requiring scaling to the object that deteriorate the quality of printouts. To summarize, there are no mechanisms to print the large-size object using the available sheets in the printing device without compromising on the size or quality of printouts. In view of this, the present disclosure is submitted.

The present disclosure provides methods and systems to solve the existing problems related to printing of the large-size object.

The present disclosure proposes methods and systems for handling printing of large-size objects such that no scaling to the large-size object is required, thus, the disclosure maintains quality of the large-size object as well as original size of the large-size object. The methods and systems print the large-size object using the available (pre-loaded) sheets in the printing device by automatically splitting the large-size object into multiple smaller segments based on the available sheets in the printing device. For printing the large-size object, the methods and systems uses the best possible combination of the multiple sheets available in the printing device and thus, utilizes sheets (i.e., resources) available with the printing device. The methods and systems overcome the problem of using one particular type of sheets by using the best possible combination of multiple sheets available with the printing device. The methods and systems further reduce the wastage of sheets and thus, offer an environmental friendly solution. The methods and systems further help save cost in manufacturing of large format papers. The methods and systems provide a mechanism which, based on the image processing, understands or recognizes the need for size and compares it against the available sheets in the printing device. The said mechanism further utilizes the best options to print multiple segments of the large-size object with geometric image transformation, image spatial transformation on the coordinates to align images accurately with morphing and orientation and thus, accommodate several segments of the large-size object in the sheets with transformation and rotation, without scaling.

Exemplary Embodiments

A method for handling printing of a large-size object at a printing device is disclosed. The method includes receiving, at the printing device, a print job including a large-size object. The large-size object is processed by the printing device, to ascertain the sizes of sheets and the corresponding number of the sheets required for printing the large-size object, wherein the processing includes dividing the large-size object into N×N spatial segments of equal size, wherein N is numeric value equal to or greater than 8; measuring the size of a single spatial segment; identifying different sizes of sheets pre-loaded in the printing device; and comparing the measured size of the single spatial segment with the different sizes of sheets pre-loaded in the printing device. Based on the comparison, performing one or more of the following ascertaining a number of largest size sheets that map with a maximum number of spatial segments out of the N×N spatial segments, or ascertaining a number of second largest size of sheets to map on un-mapped spatial segments, or ascertaining a number of the second largest size sheets and smallest size sheets, to map on the un-mapped spatial segments, or ascertaining a number of individual sheets having size matching to map on the un-mapped spatial segments, when the number of the largest size sheets, the second largest size sheets, and the smallest size sheets fails to map all the un-mapped spatial segments. Finally, the large-size object is printed, by the printing device, on multiple sheets based on the ascertainment.

The measuring of the size of the single spatial segment includes measuring the width and height of the single spatial segment to calculate the width and height of the large-size object. The comparing of the measured size of the single spatial segment with different sizes of sheets pre-loaded in the printing device, includes comparing the width and height of the single spatial segment with the width and height of each available sheet based on the following expression 1:

$$\frac{\text{Width of stock sheet}}{\text{Width of a single spatial segment}} \times \frac{\text{Height of stock sheet}}{\text{Height of single spatial segment}}$$

The print job includes an instruction to print the large-size object in a large format printing mode. The size of each spatial segment is variable and is dependent on the size of the large-size object. The ascertaining a number of individual sheets having size matching to map on the un-mapped spatial segments are carried out, for spatial segments, left un-mapped by the largest size sheets, the second largest size sheets, and the smallest size sheets. The method includes ascertaining the number and sizes of sheets pre-loaded in the printing device, after measuring the size of a single spatial segment. The processing of the large-size object includes geometrical image transformation and rotation of the largest size sheets, the second largest size sheets, the smallest size sheets, or the individual sheets, so as to map all the N×N spatial segments. The geometrical image transformation includes spatial image scaling on the coordinates to align the image morphing and orientation in the processing of the large-size object. The method is implemented in the form of a non-transitory computer-readable medium comprising instructions executable by a processing resource. One such implementation is described below.

A non-transitory computer-readable medium implementing the subject matter includes instructions executable by a processing resource. The instructions are executed to receive, at the printing device, a print job including a large-size object. The instructions are executed to process the large-size object to ascertain sizes of the sheets and the number of sheets required for printing the large-size object. The processing further includes dividing the large-size object into N×N spatial segments of equal size, wherein N is numeric value equal to or greater than 8; measuring the size of a single spatial segment to calculate the size of the large-size object; identifying different sizes of sheets pre-loaded in the printing device; comparing the measured size of the single spatial segment with the different sizes of sheets pre-loaded in the printing device. The instructions are executed to perform one or more of the following, based on the comparison ascertaining a number of largest size sheets that map with a maximum number of spatial segments out of the N×N spatial segments, or ascertaining a number of second largest size of sheets to map on un-mapped spatial segments, or ascertaining a number of the second largest size sheets and smallest size sheets, to map on the un-mapped spatial segments, or ascertaining a number of individual sheets having size matching to map on the un-mapped spatial segments, when the number of the largest size sheets, the second largest size sheets, and the smallest size sheets fails to map all the un-mapped spatial segments. The instructions are executed to print the large-size object is printed, by the printing device, on multiple sheets based on the ascertainment of sizes of the sheets and the number of sheets required for printing the large-size object.

Here, the measuring of the size of the single spatial segment includes measuring the width and height of the single spatial segment to calculate the width and height of the large-size object. The comparing of the measured size of the single spatial segment with different sizes of sheets pre-loaded in the printing device, includes comparing the width and height of the single spatial segment with the width and height of each available sheet based on the following expression 1:

$$\frac{\text{Width of stock sheet}}{\text{Width of a single spatial segment}} \times \frac{\text{Height of stock sheet}}{\text{Height of single spatial segment}}$$

The print job includes an instruction to print the large-size object in a large format printing mode. The size of each spatial segment is variable and is dependent on the size of the large-size object. The ascertaining a number of individual sheets having size matching to map on the un-mapped spatial segments are carried out, for spatial segments, left un-mapped by the largest size sheets, the second largest size sheets, and the smallest size sheets. The non-transitory computer-readable medium includes instructions executable by the processing resource to ascertain the number and size of sheets pre-loaded in the printing device, after measuring the size of a single spatial segment. The processing of the large-size object includes geometrical image transformation and rotation of the largest size sheets, the second largest size sheets, the smallest size sheets, or the individual sheets, so as to map all the N×N spatial segments. The geometrical image transformation includes spatial image scaling on the coordinates to align the image morphing and orientation in the processing of the large-size object.

A method includes receiving a print job at a printing device, the print job includes an object. The size of the object is measured. Then, sheets pre-loaded in the printing device are identified. Based on the pre-loaded sheets in the printing device, it is determined whether the object is a large-size object. The large-size object is further processed in the following manner dividing the large-size object into N×N spatial segments of equal size; calculating the number of spatial segments to be printed on a single largest size sheet and the number of the largest size sheets required to print the maximum number of spatial segments; identifying the remaining spatial segments of the large-size object; and identifying other loaded sheets and the corresponding number of other loaded sheets required to print the remaining spatial segments of the large-size object. Based on the calculation and identification, the complete large-size object is printed on multiple sheets pre-loaded in the printing device, without scaling the large-size object.

Here, identifying the pre-loaded sheets includes identifying different types of sheets; and further segregating the sheets as largest size sheets, second largest size sheets and smallest sheets.

Here, identifying the number of other loaded sheets required to print the remaining spatial segments of the large-size object includes ascertaining a number of second largest size of sheets to map on the remaining spatial segments, or ascertaining a number of the second largest size sheets and smallest size sheets, to map on the remaining spatial segments, or ascertaining a number of individual sheets having size matching to map on the remaining spatial segments, when the number of the largest size sheets, the second largest size sheets, and the smallest size sheets fails to map all the remaining spatial segments. Here, ascertaining a number of individual sheets having size matching to map on the remaining spatial segments are carried out, for the spatial segments remained (left un-mapped) by the largest size sheets, the second largest size sheets, and the smallest size sheets.

A printing device for printing a large-size object on multiple sheets is disclosed. The printing device includes a processor to receive a print job submitted by a user, wherein the print job includes an instruction to print the large-size object in a large format printing mode; divide the large-size object into N×N spatial segments of equal size, wherein N is numeric value equal to or more than 8; measure the size of a single spatial segment to calculate the size of the large-size object; compare the measured size of the single spatial segment with different sizes of sheets pre-loaded in the printing device. Based on the comparison, ascertain one or more of the following a number of largest size sheets that map with a maximum number of spatial segments out of the N×N spatial segments, or a number of second largest size sheets to map on un-mapped spatial segments, or a number of the second largest size sheets and smallest size sheets, to map on un-mapped spatial segments, or a number of individual sheets having size matching to map on the un-mapped spatial segments, when the number of the second largest size sheets and the smallest size sheets fails to map all the un-mapped spatial segments; and print the large-size object on multiple sheets based on the one or more ascertainments.

The processor of the printing device is to compare the measured size of the single spatial segment with different sizes of sheets pre-loaded in the printing device, by comparing the width and height of the single spatial segment with the width and height of each available sheet based on the following expression 1:

$$\frac{\text{Width of stock sheet}}{\text{Width of a single spatial segment}} \times \frac{\text{Height of stock sheet}}{\text{Height of single spatial segment}}$$

The size of each spatial segment is variable and is dependent on the size of the large-size object.

The processor of the printing device is to further ascertain a number of individual sheets having size matching to map on the un-mapped spatial segments, for spatial segments left un-unmapped by the largest size sheets, the second largest size sheets, and the smallest size sheets. The processor of the printing device is to ascertain the number and sizes of sheets pre-loaded in the printing device, after measurement of the size of the single spatial segment. The processor is to further identify pre-loaded sheets in the printing device.

The present disclosure directs to an improvement in handling jobs which include large-size objects, at a printing device and is not directed to generic components of performing conventional activities. The improved methods and systems use the best possible combination of sheets available with the printing device for printing the large-size objects. The output generated by the improved methods and systems include printouts of a large-size object on multiple sheets available with the printing device. Moreover, the printing device is not a generic device/component but performs specific activities and outputs tangible results, which are more than abstract items. The disclosure uses best possible combination of available sheets in order to efficiently use the sheets available with the printing device, reduces the wastage of sheets, helps save cost in manufacturing the large size sheets, and significantly reduces human efforts and time and all these features/benefits can be accounted as the much more than the abstract items. The claimed methodology leads to improvement in functionality of a computer by configuring the printing device to manage/handle printing of large-size objects. Moreover, the claimed methodology is not merely making use of generic computer and is targeted towards a specific physical machine, i.e., hardware printing device.

It should be noted that the description and the figures merely illustrate the principles of the present disclosure along with examples described herein and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present disclosure, as well as specific examples thereof, are intended to encompass equivalents thereof.

Exemplary Printing Devices

Figure 1B:
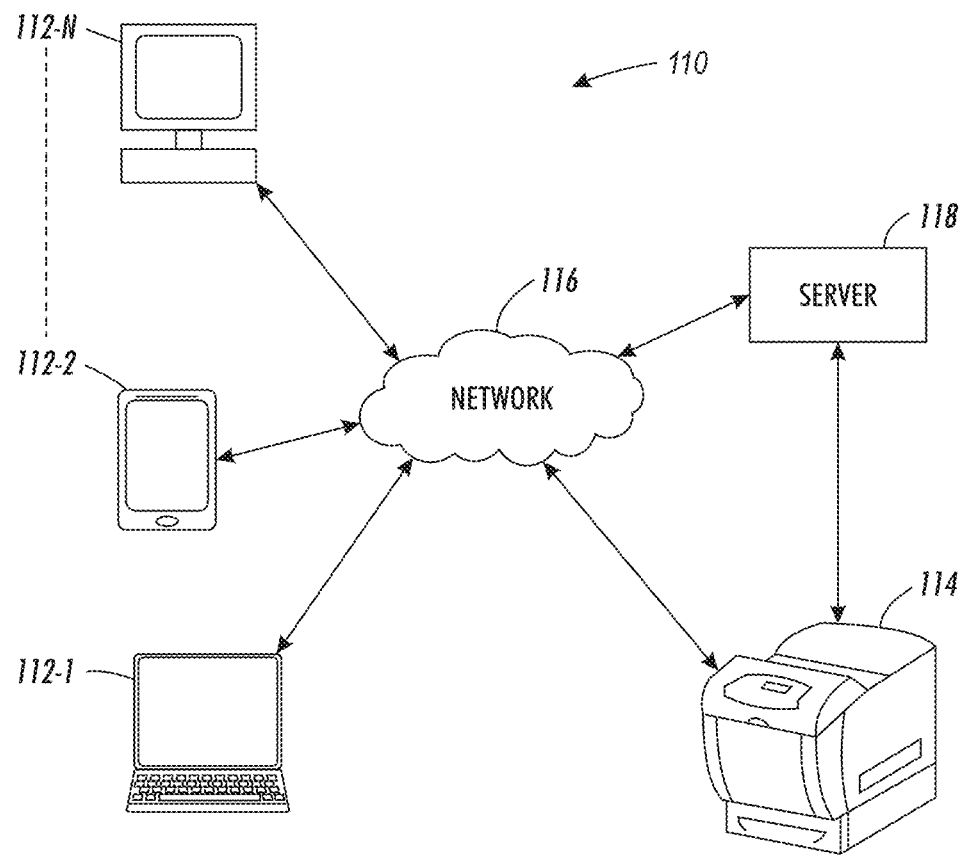
FIG. 1B is an exemplary network environment in which various inventive techniques and devices can be employed in an exemplary implementation of the present disclosure.

FIG. 1A illustrates a real physical printing device 100 for implementing the present disclosure. The printing device 100 is used for printing documents received from various users. The documents generally are of standard sizes such as A4, A3, A2, and so on. In addition to printing, the printing device 100 may include additional functionalities such as scanning, faxing, copying, imaging or the like. As shown, the printing device 100 is a standalone device, but the printing device 100 may be a part of network communicatively coupled to other devices as shown in FIG. 1B. In place of the printing device 100, the disclosure may include a multi-function device, a multi-function peripheral device, a multi-function printer and so on.

In context of the present disclosure, the printing device 100 is configured to printing a document including an object which is of size larger than standard sheets pre-loaded/available in the printing device 100, without scaling the object. For example, the printing device 100 is configured to print the object of size A0 on multiple A3 sheets, A4 sheets, other standard sheets, or a combination of various sheets as available with the printing device 100. Various examples of the large-size object may be a banner, a movie poster, a map, a billboard, a traffic sign board, and the like. To this end, the printing device 100 splits the large-size object into multiple smaller segments for printing, taking into account the available sheets in the printing device 100 and allows for mixes of various sizes sheets to meet the output sizing criteria i.e., size of the large-size object. In some implementations, rotation or transformation may be applied during the process of selecting mixed sizes sheets. For example, a dust jacket size image being printed on an A3 device may be most effectively printed using a landscape A3 with a portrait A4 sheet. In this manner, the printing device 100 selects the available sheets to print the large-size object such that the large-size object is printed in an efficient way using the already existing sheets with the printing device 100, and further prints the large-size object without any human intervention and any deterioration in output quality.

The printing device 100 may assemble the multiple printed sheets together to form a print out of the large-size object or the user may manually assemble the multiple printed sheets but assembling the multiple printed sheets does not interfere the implementation of the present disclosure.

FIG. 1B illustrates an exemplary network printing environment 110 for network printing of electronic documents, according to an example of the present disclosure. The network printing environment 110 includes a plurality of user devices 112-1, 112-2, . . . , 112-N, hereinafter collectively referred to as user devices 112 and individually as a user device 112. Examples of the user devices 112 may include, but are not limited to, workstations, personal computers, personal digital assistants (PDAs), laptop computers, notebooks, smartphones, smart cameras, smart television sets, and other smart devices.

The network printing environment 110 can include a plurality of printing devices out of which one printing device 114 is shown for the sake of simplicity. The printing device 114 and the user devices 112 are connected over a network 116 directly or through a server 118 via wired, wireless, optical, or other types of network connections as known in the art or later developed technologies. The server 118 can be a file server, an email server, a database server, a print server, or any other type of network server.

The network 116 may be a single network or a combination of multiple networks. The network 116 may include one or more area networks, such as a local area network (LAN), a wide area network (WAN), an intranet, the internet, or any other type of network. In an example, the network 116 may include a mobile communication network, for example, 2G, 3G, or 4G mobile communication network. Although only a few devices are shown coupled to network 116, a typical network may have tens or hundreds of devices coupled to one another. The network 116 may be coupled to one or more other networks, thereby providing coupling between a greater number of devices. Such can be the case, for example, when networks are coupled together via the Internet.

In an example, a user of the user device 112-2 logins to a network printing service offered by the printing device 114. The user can log in from the user device 112-2 present anywhere in the network 116, for submission of a print job to the printing device 114. For submission of the print job, the user device 112-2 can facilitate the user to access a web portal of the network printing service. In an example, the user may access the web portal by selecting a print command for printing of a large-size object on multiple sheets. In another example, the user may access the web portal by directly entering a URL address of the web portal in a web browser. In yet another example, the user may access the web portal using other web elements, such as widgets and web-enabled applications. Further, the web portal may present a user interface, such as a print dialogue box, or a graphical user interface (GUI). The user interface allows the user to provide various print options including, but not limited to, an option of specifying a "large format printing mode" to print the large-size object.

The print job may be in the form of a a page description language (PDL) document. The PDL document includes one or more objects in the form of an image, text, graphics or a combination thereof. The PDL document supports file types including such as .pdf, .doc, .docx, .ppt, .pptx, .ps, and many more without any limitation. The PDL document may include information about fonts, graphics, and the like that describe the appearance of the document present within the print job and include a set of programming language commands or specifications for processing the input document based on the information. In an example, the PDL document may include an instruction to print the large-size object in a large format printing mode. In other example, the printing device 114 automatically identifies whether the object included in the document is a large-size object based on available sheets in the printing device 114 and prints the large-size object on multiple available sheets. In such cases, the user may not require specifying printing the large-size object in the large format printing mode. The printing device 114 receives the print job from the user device 112-2 in the form of PDL document.

Based on the commands and information stored in the PDL document, the printing device 114 processes the large-size object present in the print job. The printing device 114 calculates the dimension of the large-size object to be printed; identifies various sizes sheets available with the printing device 114; splits the large-size object into multiple segments to accommodate the large-size object on multiple sheets; identifies/ascertains which type of sheet and the corresponding number of sheets maps the maximum segments of the large-size object. The step of ascertaining the type of sheet and corresponding number of sheets is performed till all the segments of the large-size object are mapped. Once all the segments of the large-size object are mapped onto the available sheets based on the ascertainment, the printing device 114 prints the large-size object onto the multiple available sheets, may be of same size or different sizes. In some implementations, the printing device 114 automatically rotates to short edge or long edge in printing the segments/segmented portion of the large-size object.

Exemplary Printing Devices and Sheets

As shown, the printing device 100, 114 may be a small size printing device or a standard size printing device. Various examples of the printing device 100, 114 may include a home printer, an office printer, a business printer, a desktop printer, a production printer, a commercial printer, and so on. In case of commercial printing device or production printing device, the printing device 100, 114 may be implemented in the form of a digital front-end (DFE) module and a digital rear-end (DRE) module, also known as digital rendering module. The printing device 100 may be an office printing device or a business printing device, while the printing device 114 may represent a home printing device. The printing device 100, 114 may be implemented in any desired form. More details will be discussed below.

The printing device 100, 114 is pre-loaded with various sheets. The sheets are of varied sizes as discussed in the table below, Table 1. The printing device 100, 114 automatically recognizes or identifies various sizes of sheets. The size of a sheet is defined/determined by width and height of the sheet and the size of sheet is measured in a pre-defined unit such as in millimeters (mm) or inches (in).

Table 1 outlines a list of various sheets and corresponding sizes that are pre-loaded/available in the printing device 100, 114. Various examples of the sheets include A3, A4, Letter, Legal and Executive.

TABLE 1

SHEETS PRE-LOADED IN THE PRINTING DEVICE

| Sheet Name | Width (mm) | Height (mm) |
|---|---|---|
| A3 | 297 | 420 |
| A4 | 210 | 297 |
| LETTER | 215.9 (216) | 279.4 (279) |
| LEGAL | 215.9 (216) | 355.6 (356) |
| EXECUTIVE | 184.1 (184) | 266.7 (265) |

Table 1 defines sheet name/type, and sizes of the sheets. Each sheet type is identified by its size in width and height given in Table 1. For example, A3 has a width 297 and height 420 and its size is defined as 297×420. Similarly, size of each sheet is defined. The sheets shown in Table 1 are just few examples, the printing device 100, 114 may have more than the above listed sheets. As per Table 1, A3 is the largest size sheet, A4 is the second largest size sheet and Executive is the smallest size sheet and the remaining sheets correspond to individual sheets.

Table 2 further outlines a list of sheets available in the printing device 100, 114 and their corresponding sizes are given in millimeters and in inches. It can be appreciated by those skilled in the art that the following known sizes of sheets are generally employed or feed in the trays of the printing device 100, 114. In Table 2, the sheets are listed in descending order, i.e., 4A0 is the largest size sheet, 2A0 is the second largest size sheet and A10 is the smallest size sheet and the remaining sheets correspond to individual sheets. Various examples of the sheets as shown include 4A0, 2A0, A0, A1, A2, A3, A4, A5, A6, A7, A8, A9, and A10.

TABLE 2

SHEETS PRE-LOADED IN THE PRINTING DEVICE

| Sheet Name | Width × Height (mm) | Width × Height (in) |
|---|---|---|
| 4A0 | 1682 × 2378 mm | 66.2 × 93.6 in |
| 2A0 | 1189 × 1682 mm | 46.8 × 66.2 in |
| A0 | 841 × 1189 mm | 33.1 × 46.8 in |
| A1 | 594 × 841 mm | 23.4 × 33.1 in |
| A2 | 420 × 594 mm | 16.5 × 23.4 in |
| A3 | 297 × 420 mm | 11.7 × 16.5 in |
| A4 | 210 × 297 mm | 8.3 × 11.7 in |
| A5 | 148 × 210 mm | 5.8 × 8.3 in |
| A6 | 105 × 148 mm | 4.1 × 5.8 in |
| A7 | 74 × 105 mm | 2.9 × 4.1 in |
| A8 | 52 × 74 mm | 2.0 × 2.9 in |
| A9 | 37 × 52 mm | 1.5 × 2.0 in |
| A10 | 26 × 37 mm | 1.0 × 1.5 in |

The various sheets are fed in various trays available with the printing device 100, 114. The sheets sizes and tray sizes are pre-defined, and the printing device 100, 114 automatically identifies all sizes sheets and corresponding tray sizes. The printing device 100, 114 may have any sizes sheets shown in Table 1 and Table 2 or may also include other sizes sheets not shown in Table 1 or Table 2.

FIGS. 2A-2D show an exemplary object 202 processed according to implementations of the present disclosure. It can be considered that the object 202 is a large-size object. The large-size object 202 is of size 1189×841 mm (46.8× 33.1 inches) and is received at the printing device 114. Based on the sheets available with the printing device 114, the printing device 114 uses the best combination of the available sheets to print the large-size object 202. Four different scenarios are discussed in FIGS. 2A-2D.

Figure 2A:
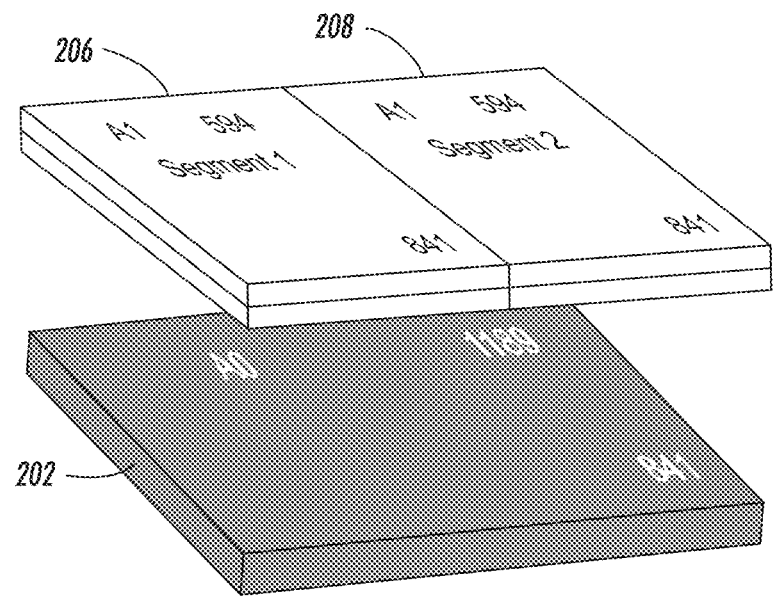
FIGS. 2A-2D illustrate multiple exemplary implementations of the inventive methods and devices proposed in the present disclosure.

As shown in FIG. 2A, the large-size object 202 received for printing is of A0 size, i.e., 1189×841 mm. And it is further considered that the sheets available in the printing device 114 is A1 type, i.e., 594×841 mm. Based on the available sheets, i.e., A1, the printing device 114 divides the large-size object 202 into multiple segments (although not shown here but shown in FIG. 4B) and calculates the number of segments that can fit on one A1 sheet and further checks if the remaining segments can fit on another A1 sheet. For example, the size of object 202 is divided into 8×8 segments, i.e., 1189/8×841/8=148.62×105.12 mm and 148.62×105.12 mm is the size of each segment. As the object 202 is divided into 8×8 segments, then 64 segments are to be mapped with the available sheets in order to map the entire object. Then, it is calculated how many segments of 64 segments can be mapped/covered by A1 sheet using expression 1 as below, i.e., 594/148×841/105=4×8=32 segments. This indicates that 32 segments can be mapped using one A1 sheet. Of 64 segments, 32 remaining segments are to be mapped. Similarly, the remaining 32 segments can be mapped using another A1 sheet. The 32 segments that can fit on one sheet A1 fall under the block 206 and similarly, the remaining 32 segments that fit onto another A1 sheet fall under the block marked as 208. Based on such ascertainment and calculation, the printing device 114 prints the large-size object 202 of size 1189×841 mm on two A1 sheets 206, 208 as clearly evident in FIG. 2A.

Figure 2B:
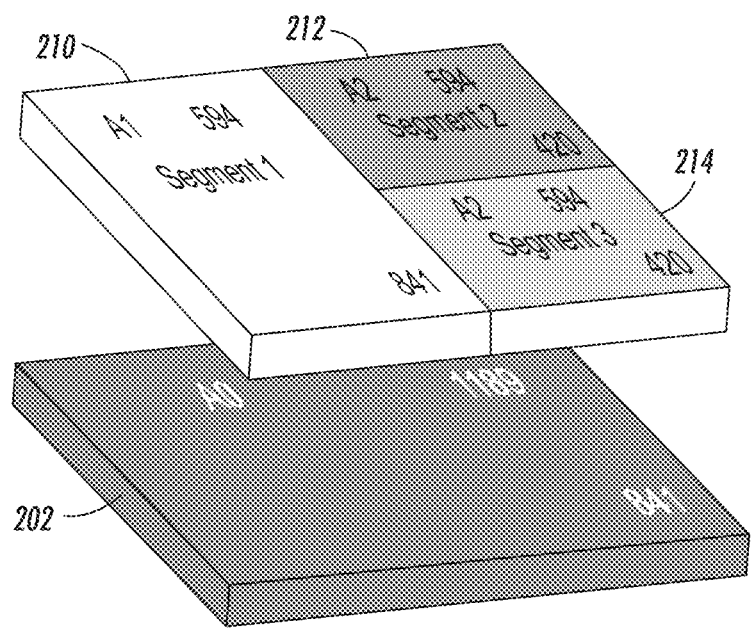

As further shown in FIG. 2B, the large-size object 202 received for printing is of A0 size, i.e., 1189×841 mm. And it is further considered that the sheet available in the printing device 114 is A1, i.e., 594×841 mm and A2 size is 420×594 mm. Based on these available sheets, the printing device 114 divides the large-size object 202 into multiple segments and calculates the number of segments that can fit on one A1 sheet and further ascertains if the remaining segments to fit on A1 or to fit on multiple A2 sheets. For example, the size of object 202 is divided into 8×8 segments, i.e., 1189/8× 841/8=148.62×105.12 and 148.62×05.12 is size of each segment. As the object 202 is divided into 8×8 segments, then 64 segments are to be mapped with available sheets in order to map the entire object 202. Then it is calculated how many segments can be covered by A1 sheet using expression 1, i.e., 594/148×841/105=4×8=32 segments. 32 segments can be mapped using A1 sheet and 32 segments are remaining to be mapped. While mapping, the printing device 114 checks if any of the sheets require rotation and here A2 requires rotations. Then, it is checked how many of 32 segments can be covered by a single rotated A2 sheet, i.e., 594/148×420/105=4×4, i.e., 16 segments can be covered by one rotated A2 sheet and the remaining 16 segments can be covered by another rotated A2 sheet. The segments that can fit on the sheet A1 fall under the block 210 and similarly, the remaining segments that can fit onto two rotated A2 sheets fall under the blocks marked as 212 and 214. Based on the above discussion, the printing device 114 prints the large-size object 202 of size 1189×841 mm on one A1 sheet and two rotated A2 sheets as clearly evident in FIG. 2B.

Figure 2C:
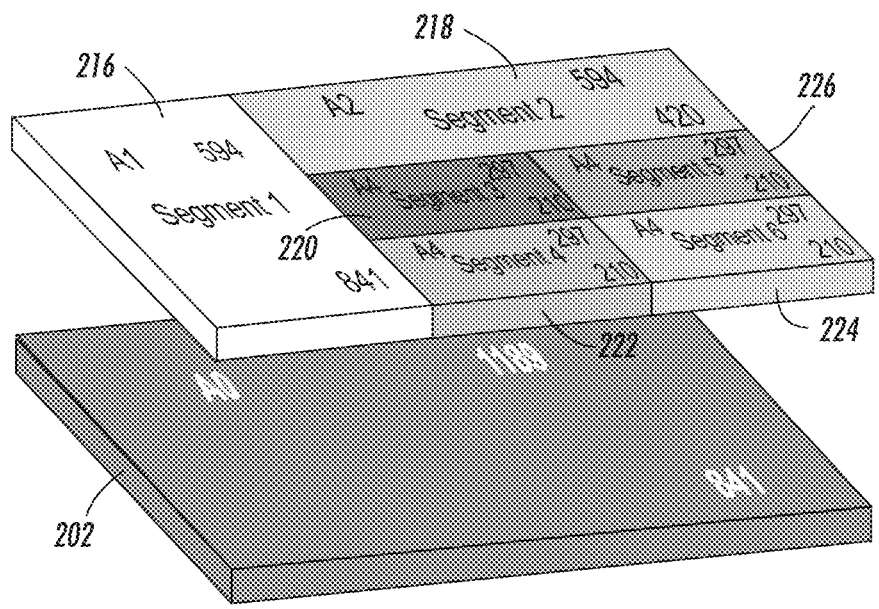

As further shown in FIG. 2C, the large-size object 202 received for printing is of A0 size, i.e., 1189×841 mm. And it is further considered that the sheets available in the printing device 114 is A1, i.e., 594×841 mm, A2 size is 420×594 mm and A4 is 210×297 mm. Based on these available sheets, the printing device 114 divides the large-size object 202 into multiple segments and calculates the number of segments that can fit on one A1 sheet and further checks and determines whether to fit the remaining segments on A1, multiple A2 or A4 sheets. Here, the size of object 202 is divided into 8×8 segments, i.e., 1189/8×841/8=148.62× 105.12 and 148.62×105.12 is size of each segment. As the object 202 is divided into 8×8 segments, then 64 segments are to be mapped with available sheets in order to map the entire object. Then it is calculated how many segments can be covered by A1 using expression 1 as below, i.e., 594/ 148×841/105=4×8=32 segments. Of 64 segments, 32 remaining segments are to be mapped on A2 and A4. While mapping, the printing device 114 checks if any of the sheets require rotation and here A2 and A4 requires rotations as width of A2 and A4 is equivalent or 2 times equivalent to width of A1, respectively. Then it is checked how many of 32 segments can be covered by a single rotated A2 sheet, i.e., 594/148×420/105=4×4, i.e., 16 segments can be covered by rotated one A2. It is further checked how many of remaining 16 segments can be covered by rotated A4. So, 297/148× 210/105=2×2, i.e., 4 segments can be covered by one rotated A4 sheet and to cover remaining 16 segments, 4 rotated A4 sheets are required. The segments that can fit on the sheet A1 fall under the block 216 and similarly, the remaining segments fit onto one rotated A2 sheets fall under the block marked as 218 and segments fit onto four rotated A4 sheets fall under the blocks 220, 222, 224, and 226. Based on the discussion here, the printing device 114 prints the large-size object 202 of size 1189×841 mm on one A1 sheet and one rotated A2 sheet and four A4 rotated sheets as clearly evident in FIG. 2C.

Figure 2D:
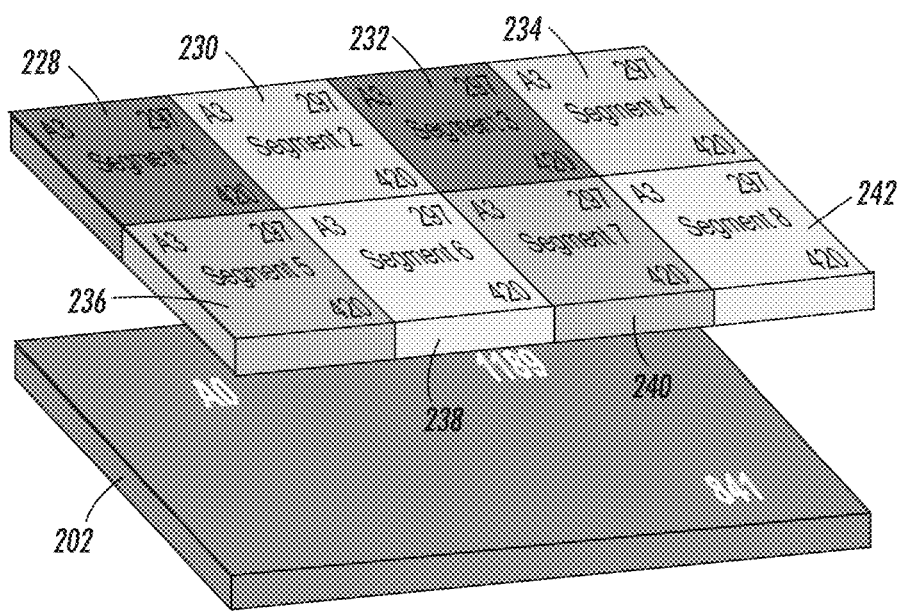

As shown in FIG. 2D, the large-size object 202 received for printing is of A0 size, i.e., 1189×841 mm. And it is further considered that the sheets available in the printing device 114 is A3, i.e., 297×420 mm. Based on the available sheets, the printing device 114 divides the large-size object 202 into multiple segments and calculates the number of segments that can fit on one A3 sheet and further checks if the remaining segments can fit on how many A3 sheet. For example, the size of object is divided into 8×8 segments, i.e., 1189/8×841/8=148.62×105.12 and 148.62×105.12 is size of each segment. Then how many segments can be covered by one A3 is calculated using expression 1 as below, i.e., 297/148×420/105=2×=8 segments. And 64 segments can be mapped with 8 A3 sheets. The segments that can fit on the first A3 sheet fall under the block 228 and similarly, the remaining segments that fit onto other A3 sheets fall under the blocks marked as 230, 232, 234, 236, 238, 240 and 242. As a next step, the printing device 114 prints the large-size object 202 of size 1189×841 mm on eight A3 sheets as clearly evident in FIG. 2D. It must be noted that the calculations shown in FIGS. 2A-2D are just for understanding purpose and approximate integral values are considered without deviating from the scope of disclosure.

It can be a scenario that the printing device 114 may have all sheets A1, A2, A3 and A4 but the printing device 114 decides which combination of multiple sheets to be used for printing. For example, the printing device 114 decides to print the object 202 only using two A1 sheets (FIG. 2A). In another example, the printing device 114 decides to print the object 202 on a combination of A1 and A2 sheets (see FIG. 2B). In further example, the printing device 114 decides to print the object 202 on a combination of A1, A2 and A4 (see FIG. 2C). In an additional example, the printing device 114 decides to print the object 202 on multiple A3 sheets (see FIG. 2D). In some implementations, the sheets may be chosen based on preferences of a user and the user can provide his inputs using a user interface (although not shown) of the printing device 114.

Based on examples shown in FIGS. 2A-2D, it is understood that the large-size object can be printed on multiple sheets in any combination based on sheets available in the printing device 114. While printing, the rotation of sheets can be performed to map the object size. In this manner, the present disclosure prints the large-size object, (i) without scaling or clipping, i.e., without removal of unnecessary white spaces, (ii) using the printing device 114 that has sheets of size smaller than that of the large-size object. For example, the present disclosure allows the printing device 114 to automatically split the large-size object into sizes of multiple sheets supported by the printing device 114 without scaling but by transforming and rotating the large-size object either by SEF or LEF. SEF or LEF are useful for rotating images on the sheets while selecting the sheets available in the printing device 114.

Figure 3:
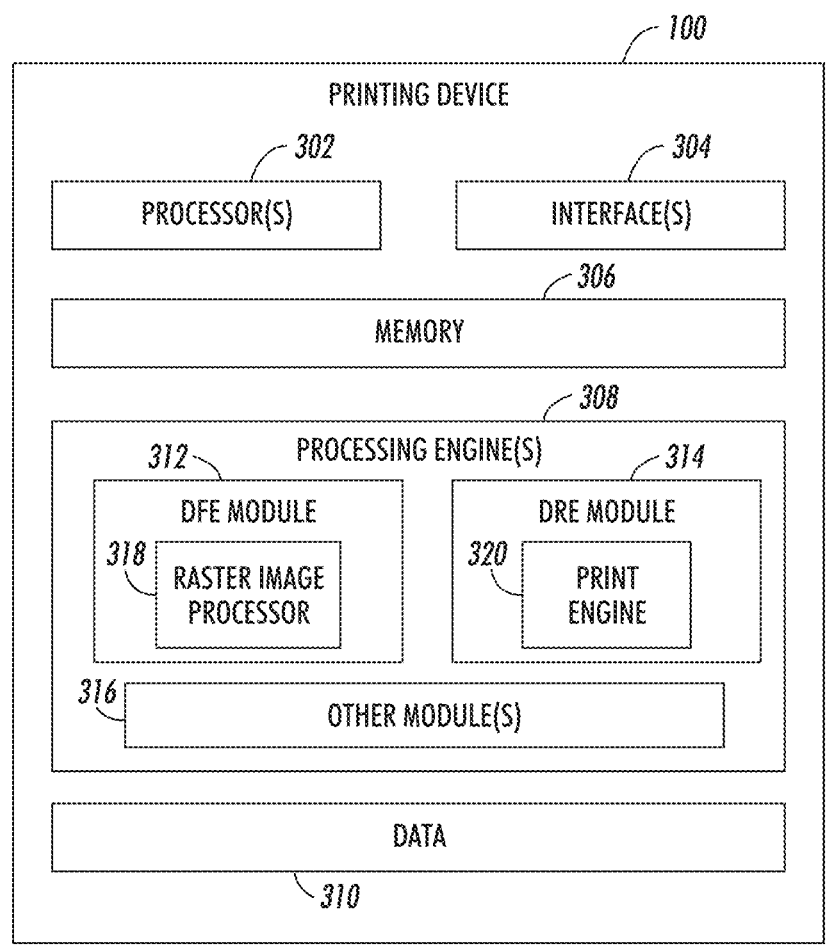
FIG. 3 illustrates various components of an exemplary printing device that can be utilized to implement one or more exemplary embodiments of the present disclosure.

FIG. 3 illustrates various components of the printing device 100, 114, in accordance with one example of the present disclosure. For simplicity, the printing device 100 is referred to for the purpose of discussion. The printing device 100 includes a processor(s) 302, an interface(s) 304, and a memory 306.

The processor(s) 302 may be implemented as one or more microprocessors, microcomputers, microcontrollers, digital signal processors, central processing units, logic circuitries, and/or any devices that manipulate data based on operational instructions. Among other capabilities, the one or more processor(s) 302 are configured to fetch and execute computer-readable instructions stored in the memory 306 of the printing device 100. The memory 306 may store one or more computer-readable instructions or routines, which may be fetched and executed to create or share the data units over a network service. The memory 306 may include any non-transitory storage device including, for example, volatile memory such as RAM, or non-volatile memory such as EPROM, flash memory, and the like. The memory 306 may store the large-size object as received and when the large-size object is under process. The memory 306 may store any information relevant while implementing the present disclosure.

The interface(s) 304 may include a variety of interfaces, for example, interfaces for data input and output devices referred to as I/O devices, storage devices, and the like. The interface(s) 304 may facilitate communication of the printing device 100 with various devices coupled to the printing device 100. The interface(s) 304 may also provide a communication pathway for one or more components of the printing device 100. Examples of such components include, but are not limited to, processing engine(s) 308 and data 310. The data 310 may include data that is either stored or generated as a result of functionalities implemented by any of the components of the processing engine(s) 308.

The processing engine(s) 308 may be implemented as a combination of hardware and programming (e.g., programmable instructions) to implement one or more functionalities of the processing engine(s) 308. In examples described herein, such combinations of hardware and programming may be implemented in several different ways. For example, the programming for the processing engine(s) 308 may be processor executable instructions stored on a non-transitory machine-readable storage medium and the hardware for the processing engine(s) 308 may include a processing resource (e.g., one or more processors), to execute such instructions. In the present examples, the machine-readable storage medium may store instructions that, when executed by the processing resource, implement the processing engine(s) 308. In such examples, the printing device 100 may include the machine-readable storage medium storing the instructions and the processing resource to execute the instructions or the machine-readable storage medium may be separate but accessible to the printing device 100 and the processing resource. In other examples, the processing engine(s) 308 may be implemented by electronic circuitry.

The processing engine(s) 308 includes a digital front-end (DFE) module 312, a digital rear-end (DRE) module 314, and other module(s) 316. The DFE module 312 further includes a raster image processor (RIP) 318, and the DRE module 314 further includes a print engine 320. The other module(s) 316 may implement functionalities that supplement applications or functions performed by the printing device 100 or the processing engine(s) 308.

In operation, the DFE module 312 of the printing device 100 receives a print job. The print job may be submitted by the user via a user device such as a computing device. The print job may be submitted by the user through a computer readable storage medium. The print job may be submitted by the user through a gateway. The print job may be submitted through a memory of the printing device 100. The print job includes a document having one or more objects in the form of text, image, graphics or a combination thereof. At least one object is a large-size object and the objects which are standard size objects, i.e., same as size of the standard sheets available with the printing device 100 may be processed with conventional methods. The large-size object is processed in accordance with the present disclosure and this will be discussed below in great detail.

Once the print job is received, the DFE module 312 decomposes the print job to determine whether the "large format printing mode" is selected by the user or not. In case it is determined that the "large format printing mode" is selected, the DFE module 312 calls the raster image processor (RIP) 318 to process the large-size object present in the print job to ascertain the number and sizes of sheets required for printing the large-size object. The processing includes dividing the large-size object into 8×8 spatial segments of equal sizes and comparing the measured size of the single spatial segment with different sizes of sheets pre-loaded in the printing device 100. Based on the comparison, the DFE module 312 ascertains one or more of the following, (i) a number of largest size sheets that map with a maximum number of spatial segments out of the N×N spatial segments, (ii) a number of second largest size sheets to map on un-mapped spatial segments, (iii) a number of the second largest size sheets and smallest size sheets to map on the un-mapped spatial segments, or (iv) a number of individual sheets having size matching to map on the un-mapped spatial segments, when the number of the largest size sheets, the second largest size sheets, and the smallest size sheets fails to map all the un-mapped spatial segments.

Figure 4A:
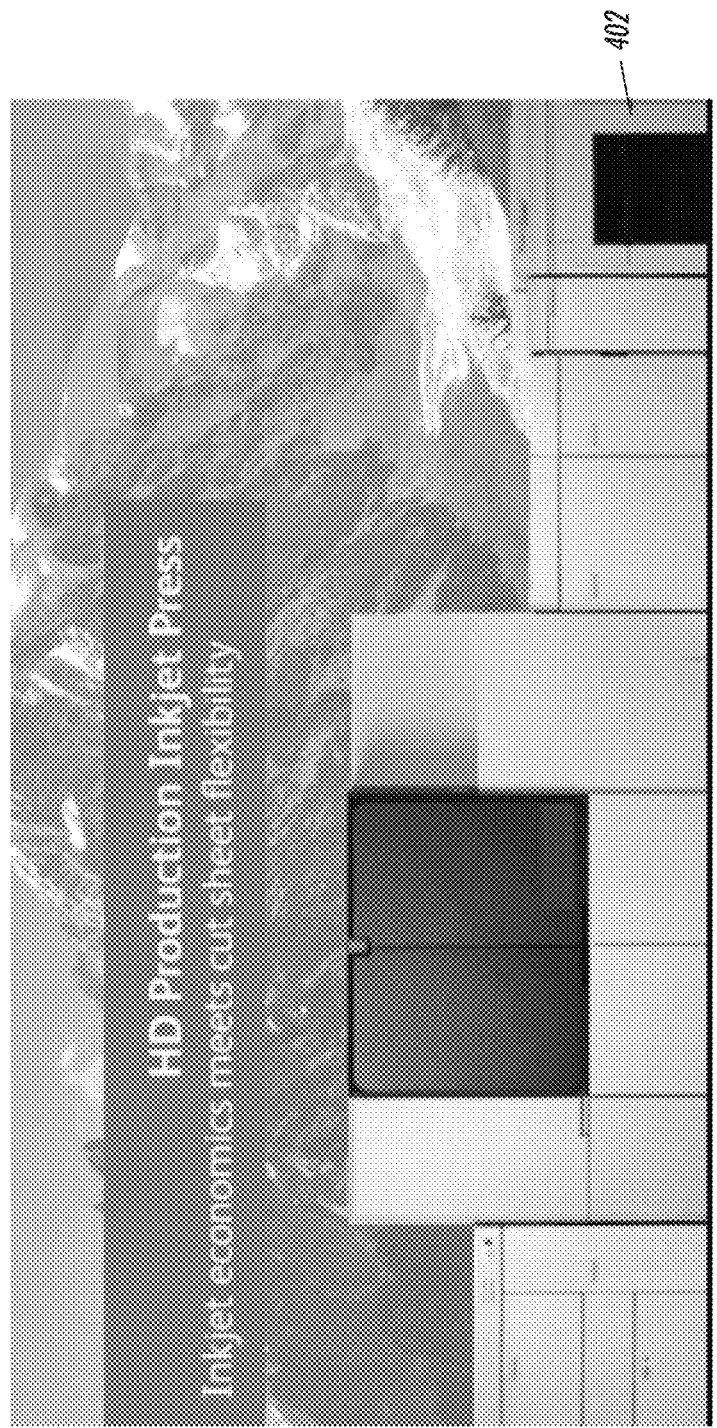
FIGS. 4A-4C illustrate exemplary implementations of the printing process, according to an exemplary embodiment of the present disclosure.
Figure 4B:
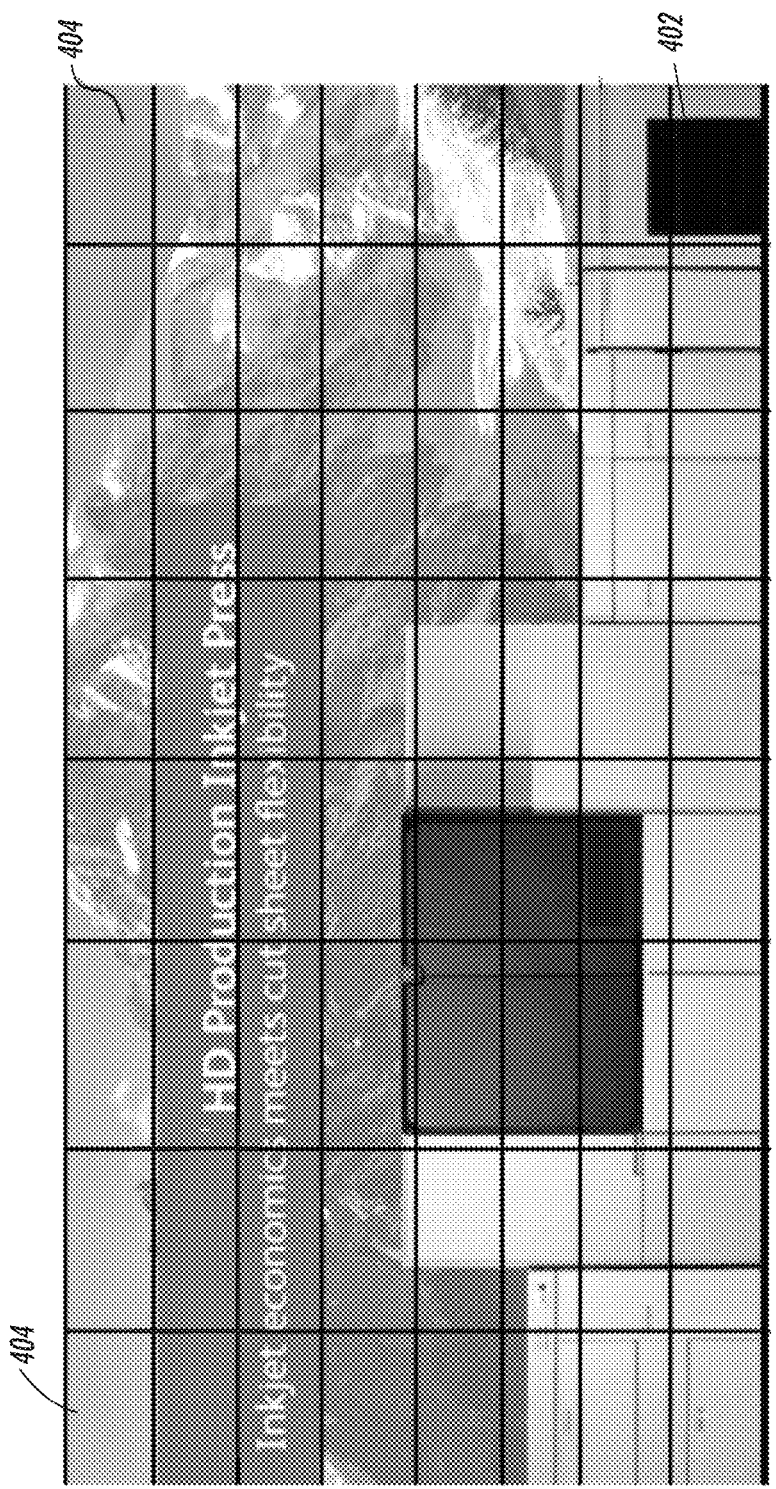
Figure 4C:
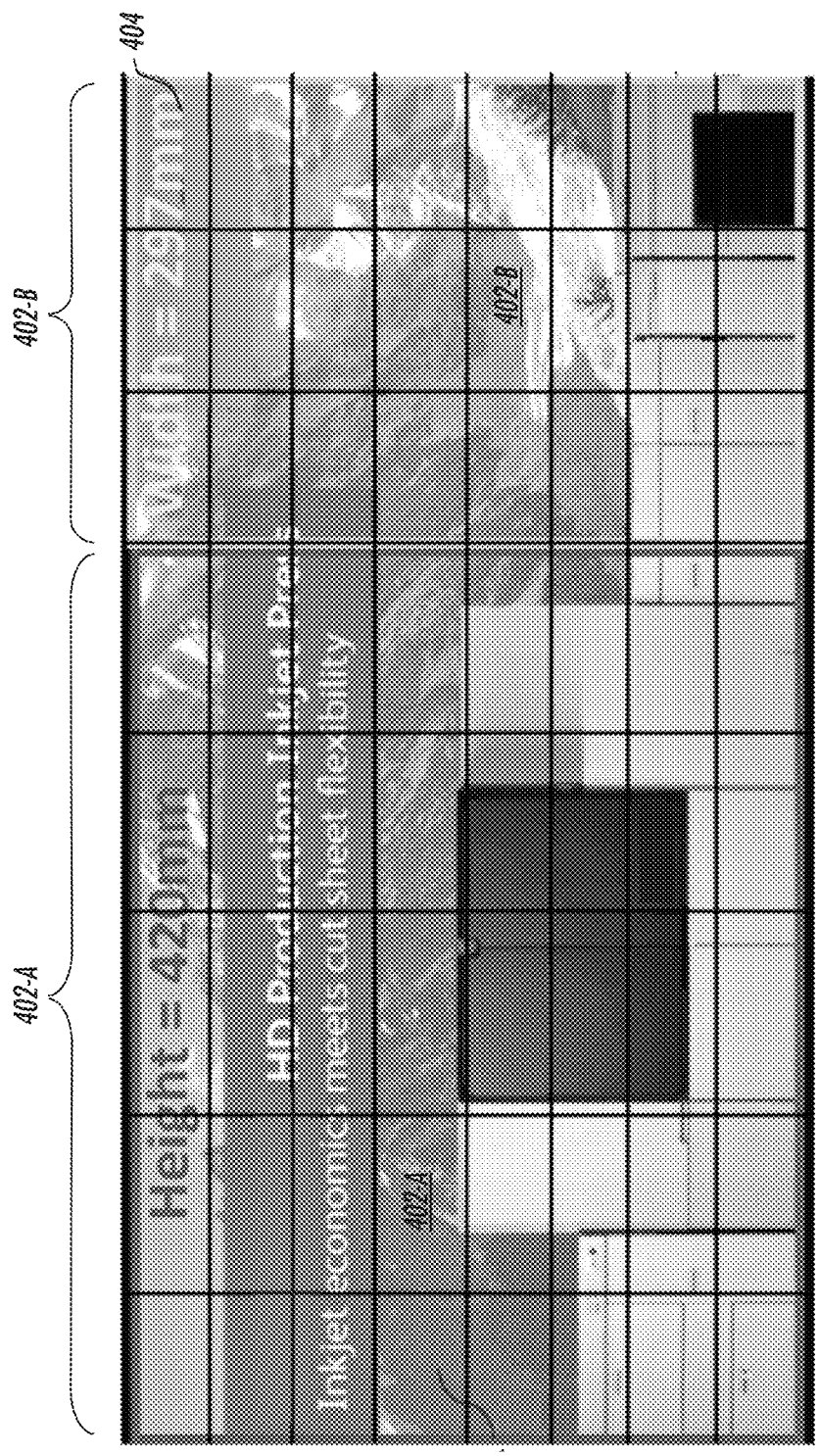

One exemplary implementation is shown in FIGS. 4A-4C. FIG. 4A shows an object 402 and the object 402 is considered as a large-size object 402 of size594×609 mm to be printed using a small printing device. The DFE module 312 of the printing device 100 receives the large-size object 402 to be printed on multiple sheets. Upon receipt of the print job, the DFE module 312 calls the RIP 318 to process the large-size object 402 present in the print job. As mentioned above, the processing of the large-size object 402 is performed by dividing the large-size object 402 into 8×8 spatial segments. The total number of segments after dividing or splitting the object 402 is 64 segments and one such segment is marked as 404 in FIG. 4B. Multiple segments when combined to map on any sheet may be referred to as segmented portion. The RIP 318 measures width and height of each of the spatial segments 404 in the predefined unit. In an example, the predefined unit can be millimeters or inches. For instance, in FIG. 4B, the large-size object 402 of size 594×609 mm is divided into 8×8 spatial segments 404, wherein each of the spatial segments 404 is having a width of 74.25 mm (594/8) and height of 76.125 mm (609/8).

Those skilled in the art can appreciate that the size of the spatial segments is not fixed and varies based on the total size of the large-size object. For example, in case the large-size object is of size 1189×841 mm, then each of the spatial segments may be having a width of 148.625 mm (1189/8) and height of 105.125 mm (841/8).

Continuing with the example of FIG. 4B, once the size of each of the spatial segments 404 is measured, the RIP 318 ascertains the number and sizes of sheets pre-loaded in the printing device 100. Based on the sheets available in the feed trays of the printing device 100, the RIP 318 ascertains A3 sheet of size 297×420 mm is the largest size sheet in the printing device 100, A4 sheet of size 210×297 mm as the second largest sheet and Executive 184.1×266.7 mm as the smallest size sheet available in the printing device 100.

Following this, the RIP 318 compares the measured size of the single spatial segment 404 with the different sizes of sheets pre-loaded in the printing device 100 using the following expression 1:

$$\frac{\text{Width of stock sheet}}{\text{Width of a single spatial segment}} \times \frac{\text{Height of stock sheet}}{\text{Height of single spatial segment}}$$

The expression 1 outputs the exact number of segments that can be utilized by a particular sheet. In other words, the expression 1 indicates total area/segments being covered by a particular sheet. As the expression 1 provides the number of segments that are utilized out of 8×8 so only integral value may be considered, the decimal part is left off and reconsidered in the next iteration.

Based on the comparison, the RIP 318 compares single spatial segment with A3 sheet using the expression 1, 297/74×420/76=4×5=20 segments can be covered using one single A3 sheet and 20 more segments can be covered by another A3 sheet. In this manner, two largest size sheets A3 utilizes 40 segments marked as 402-A, resulting in a difference in width (W)=297 mm and height (H)=189 mm between the A3 size and the original size of the large-size image 402. With this difference, the RIP 318 considers the second largest size A4 as the next sheet to cover/map the remaining (non-mapped) 24 spatial segments. The RIP 318 further performs geometric transformation and rotation for the A4 sheet, as the height (297 mm) of A4 is equal to the width (297 mm) of the A3 sheet. The RIP 318 further checks how many segments can be covered using rotated A4, i.e., 297/74×210/76=4×2=8 segments. One rotated A4 sheet can cover 8 segments and 3 A4 rotated sheets can cover the remaining 24 segments. The segmented portion to be mapped using A3 sheets is marked as 402A and the segmented portion to be mapped using rotated A4 sheets is marked as 402B, as shown in FIG. 4C. The block 402A of size with width 297×height 420 mm can be accommodated in multiple A3 sheets. The block 402B of the remaining object size (with width=297 mm, height=189 mm) which is transformed and rotated to accommodate in multiple A4 sheets.

After the processing of the large-size object, the RIP 318 performs raster image processing on the large-size object to fabricate a raster buffer. In one example, the raster buffer may include pixel display values or pixel values arranged in raster format. Example of raster formats may include, but not limited to, JPEG, TIFF, RAW, PNG, GIF, BMP, PPM, PGM, PBM, XBM, ILBM, WBMP, and PNM. The raster buffer that is generated by the RIP 318 is immediately consumed by the DRE module 314. The DRE module 314 then calls the print engine 320. The print engine 218 then converts the raster buffer into a ready-to-print (RTP) format and is further printed on multiple sheets. In this manner, the large-size object is printed on multiple sheets.

Continuing with the example of FIGS. 4A-4C, the object 402 is printed on two A3 sheets and three rotated A4 sheets. The segments fall under the block 402-A are printed on A3 sheets and the segments fall under the block 402-B are printed on rotated A4 sheets. The printing device 100 uses the best possible combination of the sheets available with the printing device 100. The best possible combination in this case is A3 and A4 but there may be other possible combinations to print the large-size object 402. In this manner, the printing device 100 ensures that the wastage in use of sheets is reduced by appropriately selecting standard size sheets for printing the large-size object.

The components of the printing device 100 shown in FIG. 3 are exemplary in nature and these components may vary. In another implementation, the printing device 100 may include components such as a processor or a processing resource, a user interface, a memory and a raster image processor. The functions of handling the printing of large-size job may be executed by the processor or the processing resource.

According to FIG. 3, the present disclosure is implemented by the printing device or its components. However, the present disclosure may be implemented by a server (although not shown). In such scenarios, all functionalities related to, (i) processing the large-size object including dividing the large-size object, measuring the size of a single spatial segment, identifying different sizes sheets, comparing the size of single spatial segment with different sizes sheets, and (ii) ascertaining the number of various sizes sheets required to map all segments, etc., is performed by the server. This way, the server can perform all calculations, measurements, identifications and ascertainments. Based on the processing and ascertainments, the server passes the processed large-size object and the information including sheet sizes and the corresponding number of sheets to print the large-size object. As a result, the printing device 100 prints the large-size object on multiple sheets according to the information/instructions from the server.

Figure 5:
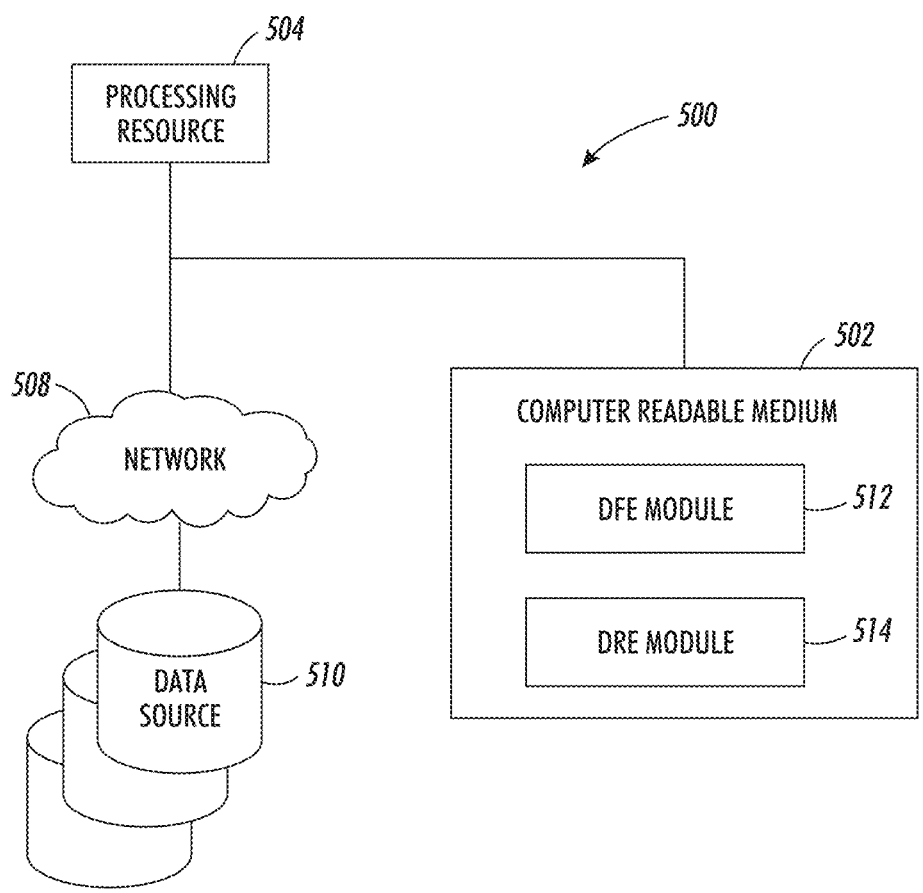
FIG. 5 illustrates a network environment for operating a printing device, according to an exemplary embodiment of the present disclosure.

FIG. 5 illustrates an example network environment 500 using a non-transitory computer-readable medium 502 for executing operation of the printing device 114, according to an example of the present subject matter. The network environment 500 may be a public networking environment or a private networking environment. In one example, the network environment 500 includes a processing resource 504 communicatively coupled to the non-transitory computer readable medium 502 through a communication link (although no shown).

The processing resource 504 can be a processor of the printing device 114. The non-transitory computer-readable medium 502 can be, for example, an internal memory device or an external memory device. In one example, the communication link may be a direct communication link, such as one formed through a memory read/write interface. In another example, the communication link may be an indirect communication link, such as one formed through a network interface. In such a case, the processing resource 504 can access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 can include, for example, databases and computing devices. The data sources 510 may be used by the database administrators and other users to communicate with the processing resource 504.

In one example implementation, the non-transitory computer readable medium 502 includes a set of computer readable instructions, such as a digital front-end (DFE) module 512 and a digital rear-end (DRE) module 514. The set of computer readable instructions referred to as instructions hereinafter, can be accessed by the processing resource 504 through the communication link and subsequently executed to perform acts for network service insertion. In other words, during operation, the processing resource 504 can execute the DFE module 512 and the DRE module 514.

On execution by the processing resource 504, the DFE module 512 receives a print job including a large-size object. Upon receipt of the print job, the DFE module 512 processes the large-size object present in the print job. The processing includes dividing the large-size object into 8×8 spatial segments of equal sizes and comparing the measured size of the single spatial segment with different sizes of sheets pre-loaded in the printing device 114. Based on the comparison, the DFE module 512 ascertains one or more of the following, (i) a number of largest size sheets that map with a maximum number of spatial segments out of the N×N spatial segments, (ii) a number of second largest size sheets to map on un-mapped spatial segments, (iii) a number of the second largest size sheets and smallest size sheets to map on the un-mapped spatial segments, or (iv) a number of individual sheets having size matching to map on the un-mapped spatial segments, when the number of the largest size sheets, the second largest size sheets, and the smallest size sheets fails to map all the un-mapped spatial segments.

After processing the large-size object, the DRE module 514 prints the large-size object on multiple sheets, based on the ascertainment of the number and size of the sheets required for printing the large-size object.

Figure 6:
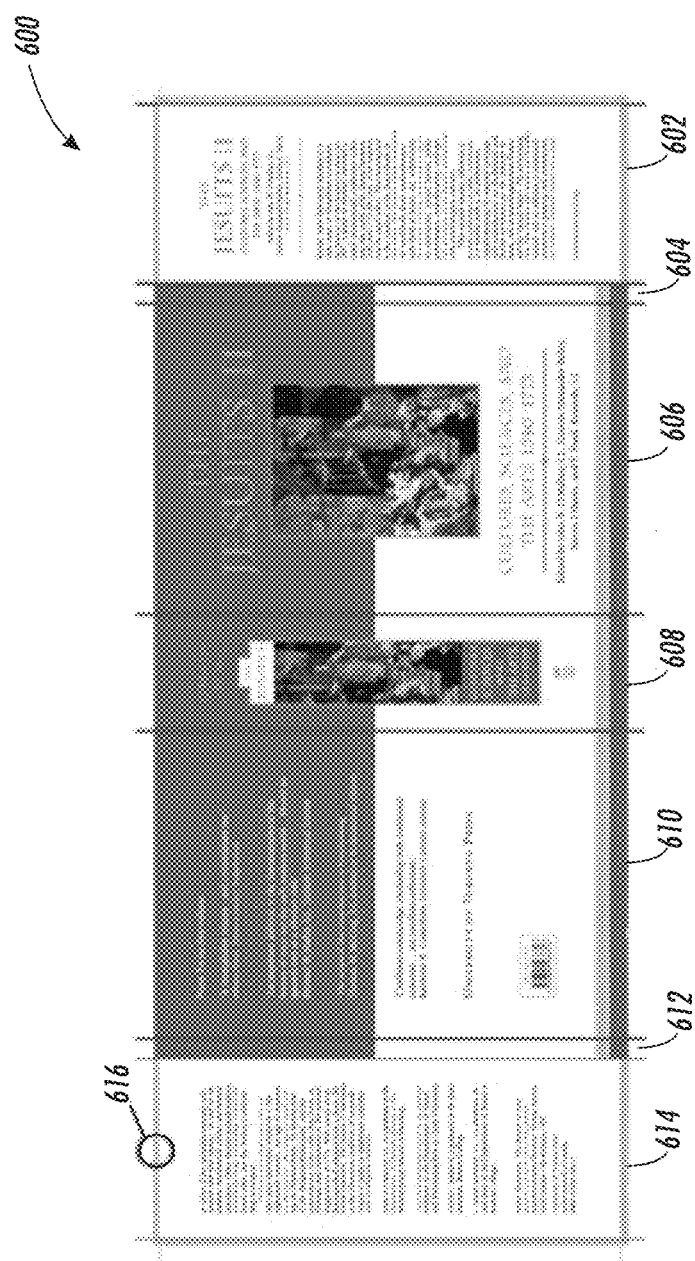
FIG. 6 illustrates an exemplary dust jacket for a book for the implementation of the inventive methods and devices.

Those skilled in the art can appreciate that the present subject disclosure is not only applicable to large images such as posters or banners but can support foldable/finishing folds job and selects sheets based on options such as Left/Right/Top/Bottom folds. For instance, the present disclosure can be implemented to prepare a dust jacket of a book. The dust jacket is a detachable outer cover usually made of paper and printed with text and/or illustrations. An exemplary dust jacket 600 is represented in FIG. 6. The dust jacket 600 includes a front flap 602, a front wrap 604, a front panel 606, a spine 608, a back panel 610, a back wrap 612, a back flap 614, and a bleed 616. The dust jacket 600 has folded flaps that hold it to the front and back book covers. For the dust jacket 600, the present subject disclosure helps for folds and based on the size of the folds, the images can be segmented, oriented and transformed to fit in the available sizes of sheets in order to minimize the need for cut.

Exemplary Flowcharts

Figure 7:
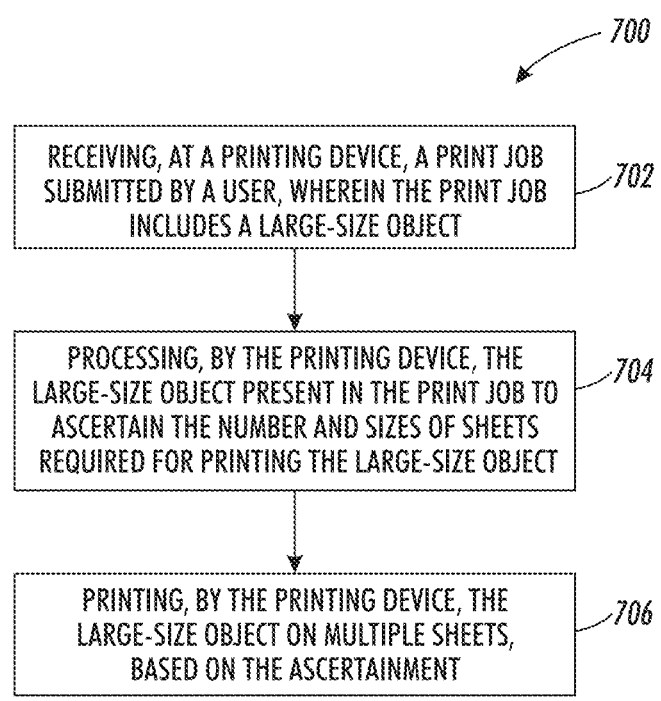
FIG. 7 is a method flowchart for handling printing of a large-size object, according to an exemplary embodiment of the present disclosure.

FIG. 7 illustrates a method 700 for operating the printing device 114, according to an implementation of the present disclosure. Reference to other FIGS. 1, 2A-2D, 3, 4A-4C, 5-6, 8, 9A-9B may be made while discussing FIG. 7. Specifically, the method 700 describes handling printing of a large-size object. The method 700 outlines how the large-size object is handled or printed when the size of the object is larger than the largest size sheets available in the printing device 114. In such cases, the printing device 114 may be termed as a small printing device 114 or a standard printing device. The method 700 is implemented by the printing device 114. The order in which the method 700 is described is not intended to be construed as a limitation, and any number of the described method blocks can be combined in any appropriate order to carry out the method 700 or an alternative method. Additionally, individual blocks may be deleted from the method 700 without departing from the scope of the subject matter described herein.

The method 700 can be performed by programmed computing devices, for example, based on instructions retrieved from the non-transitory computer-readable medium or non-transitory computer-readable media. The computer-readable media can include machine-executable or computer-executable instructions to perform all or portions of the described method. The computer readable media may be, for example, digital memories, magnetic storage media, such as magnetic disks and magnetic tapes, hard drives, or optically readable data storage media.

At block 702, the method 700 includes receiving, at the printing device 114, a print job submitted by a user. The print job includes a large-size object. The print job may include an instruction to print the large-size object in a large format printing mode.

At block 704, the method 700 includes processing the large-size object present in the print job to ascertain/determine the number and sizes of sheets required for printing the large-size object. The processing of the large-size object includes measuring the size of the large-size object. Then, various sizes sheets and corresponding number of the sheets available with the printing device 114 are identified. From the various sizes sheets, the method 700 further identifies largest size sheets, second largest size sheets, smallest size sheets or individual sheets. After identification, it is identified what type/size of sheets and how many of those particular sheets (the number) are required for printing the whole large-size object. In this way, the best possible combination of multiple sheets available with the printing device 114, to print the large-size object, is identified. The best possible combination may be based on the size of the large-size object. The best possible combination may include multiple sheets of same size or different sizes. For example, the best possible combination may include largest size sheets to print the large-size object. In another related example, the best possible combination may include second largest size sheets. In further, the best possible combination may include a combination of largest size sheets and second largest size sheets. The combination may be selected as the number of largest size sheets are not sufficient and thus the second largest size sheet may be selected. These are just exemplary combinations; the printing device may select sheets in any combination in order to print the large-size in the most efficient manner.

At block 706, the method includes printing the large-size object on multiple sheets, based on the ascertainment of the number and sizes of the sheets required for printing the large-size object. For example, the large-size object may be printed on multiple largest size sheets. In another, the large-size object may be printed on a combination of the largest size sheets and second largest size sheets. In further example, the large-size object may be printed on a combination of the largest size sheets, second largest size sheets, and smallest size sheets. In furthermore example, the large-size object may be printed on a combination of the largest size sheets, second largest size sheets, smallest size sheets and individual sheets. More details on the best possible combination and other aspects are discussed above and will be discussed in subsequent method flowcharts 800 and 900.

Figure 8:
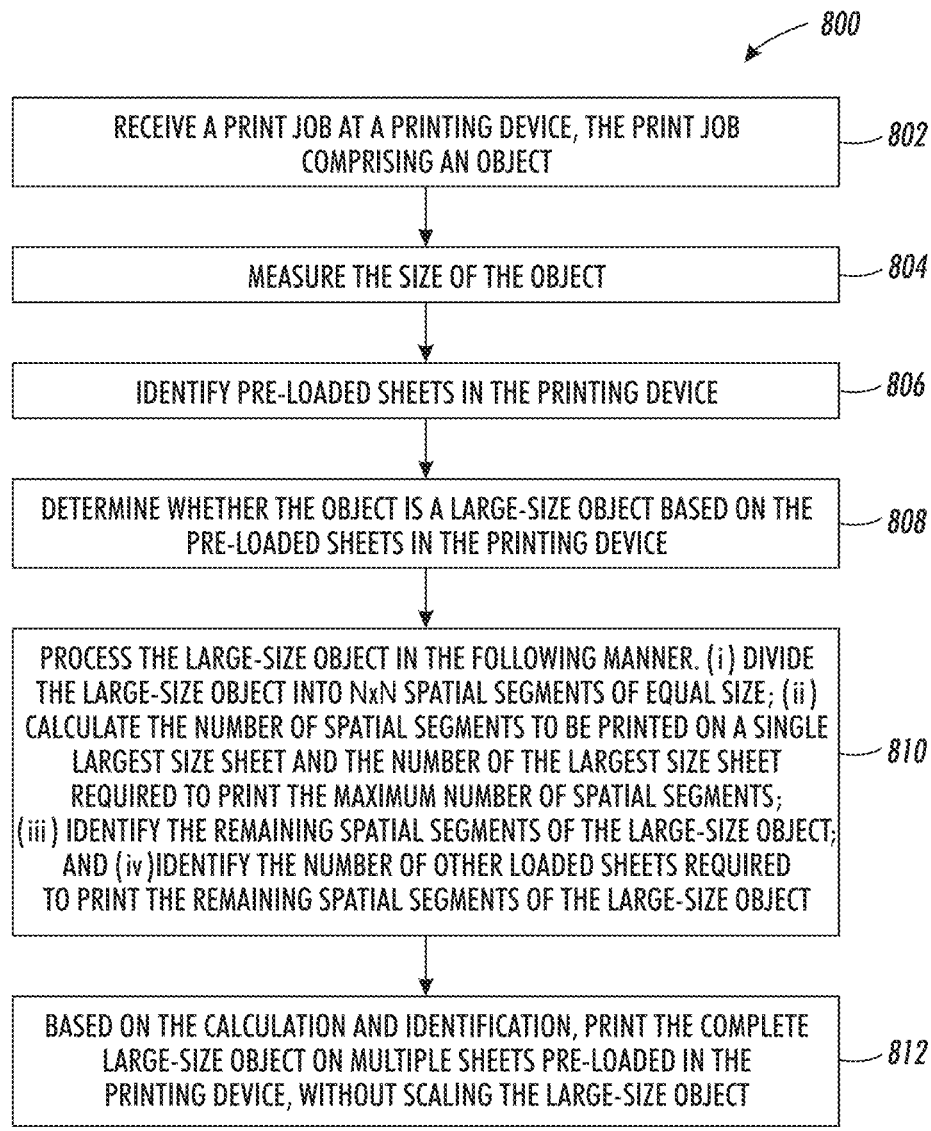
FIG. 8 illustrates a detailed method for handling printing of an object, according to an exemplary embodiment of the present disclosure.

FIG. 8 is a method 800 for handing a large-size object. The method begins with when a user submits a print job for printing. The method includes receiving the print job at a printing device at 802, the print job includes an object. The print job may include multiple objects. Then, at 804, size of the object is measured, i.e., width and height of the object is measured.

At 806, sheets pre-loaded in the printing device are identified. The identification includes identifying different types (i.e., sizes) of sheets available with the printing device. Upon identification, the different types of sheets are further segregated as largest size sheets, second largest size sheets, smallest size sheets and individual sheets. The segregation of the sheets is performed based on size of the sheets, i.e., width and height of the sheets.

At 808, based on the pre-loaded sheets in the printing device, it is determined whether the object is a large-size object or not. For example, if the object is of size 1189×814 and the printing device includes A2 and A4 sheets, i.e., 420×594 mm and 210×297 mm size sheets, respectively, the object is considered as the large-size object.

Then at 810, the large-size object is processed in the following manner. The large-size object is divided into N×N spatial segments of equal size, where N is equal to or greater than 8. The value of N may vary. The number of spatial segments to be printed on a single largest size sheet and the number of the largest sheets required to print the maximum number of spatial segments, is calculated. The remaining spatial segments of the large-size object are identified and calculated. The other loaded sheets and the number of other loaded sheets required to print the remaining spatial segments of the large-size object, are identified. The other loaded sheets may be second largest size sheets, smallest size sheets or individual sheets. The identification includes ascertaining a number of second largest size of sheets to map on the remaining spatial segments or ascertaining a number of the second largest size sheets and smallest size sheets, to map on the remaining spatial segments, or ascertaining a number of individual sheets having size matching to map on the remaining spatial segments, when the number of the largest size sheets, the second largest size sheets, and the smallest size sheets fails to map all the remaining spatial segments. The step of ascertaining a number of individual sheets having size matching to map on the remaining spatial segments, is carried out when the remaining spatial segments are left unmapped by the largest size sheets, the second largest size sheets, and the smallest size sheets. In this manner, it is identified and calculated the type of sheets and the corresponding number of sheets required for printing the large-size object.

At 812, based on the calculation and identification above, the complete large-size object is printed on multiple sheets pre-loaded in the printing device, without scaling the large-size object.

Figure 9A:
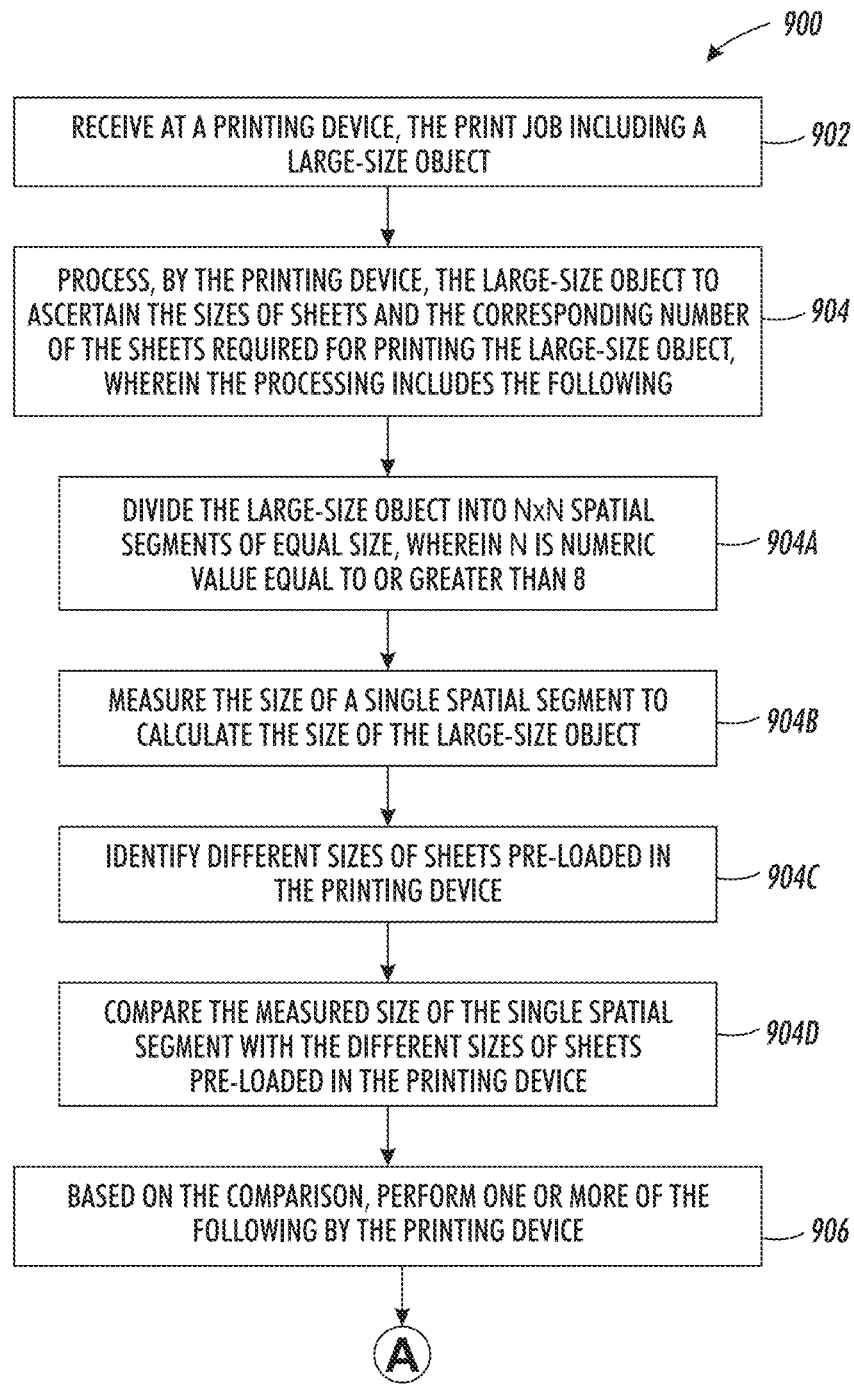
FIGS. 9A-9B represent a detailed method for handling printing of a large-size object, according to an exemplary embodiment of the present disclosure.
Figure 9B:
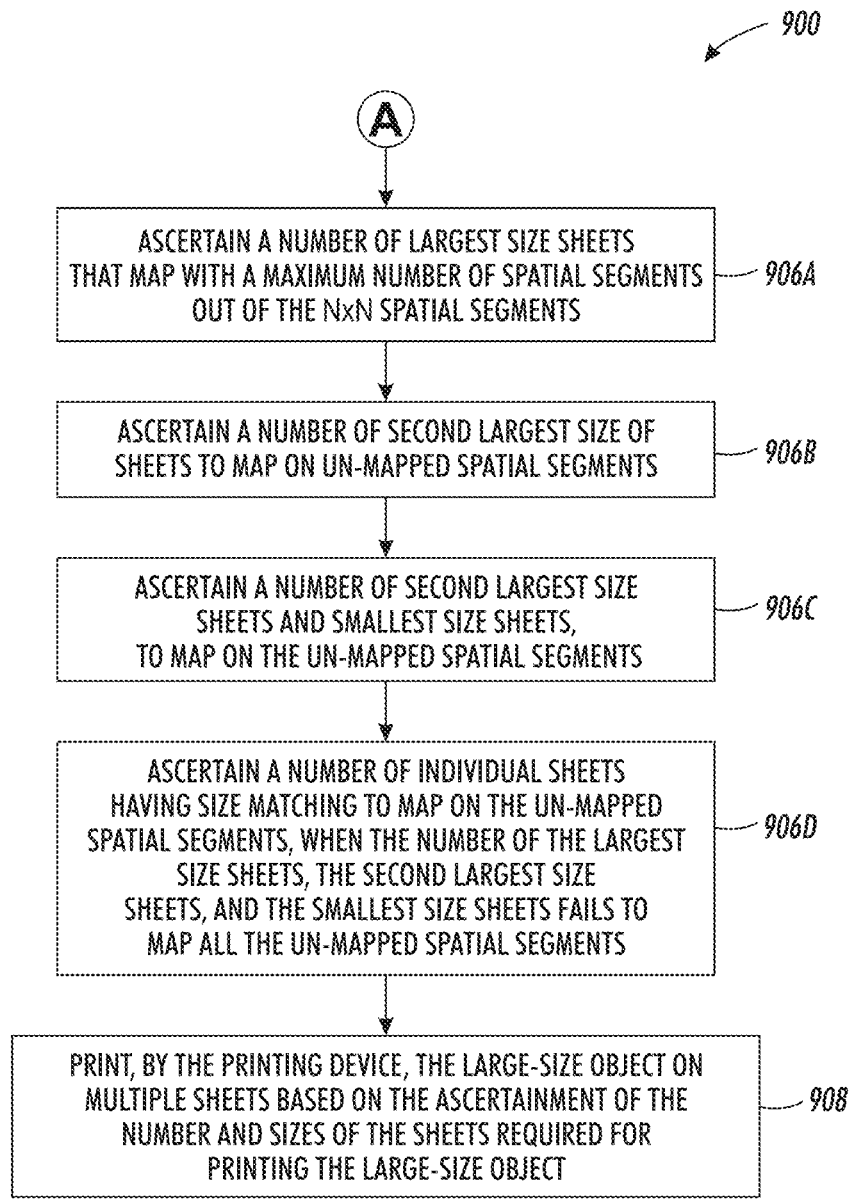

FIGS. 9A-9B represent a method flowchart 900 for handling printing of an object such as a large-size object. While discussing the method 900, it is considered that the object received is a large-size object. The method 900 is implemented by a printing device, a raster image processor, a processor of the printing device, or an equivalent device. The method begins with when a user wishes to print the large-size object such as a wallpaper. The user submits a print job from his device such as a mobile device or from a computer-readable or storage medium or uses other ways to submit the print job. The print job includes a large-size object. Along with submitting the print job, the user may submit an instruction to print the large-size object in a large format printing mode. In other examples, the printing device may automatically determine the large-size object to be printed in the large format printing mode.

Once submitted by the user, at 902, the print job including the large-size object is received, at the printing device.

Then, at block 904, the large-size object is processed by the printing device to ascertain sizes of sheets and the number of sheets required for printing the large-size object. The processing includes a number of steps as 904A, 904B, 904C, and 904D. At 904A, the large-size object is automatically divided into N×N spatial segments of equal size, where N is a numeric value equal to or greater than 8. As mentioned above with reference to FIGS. 4A-4C, the size of each spatial segment is dependent on the size of the large-size object.

Once the large-size object is divided into N×N spatial segments of equal size, at 904B, the size of a single spatial segment is measured. The size of the single spatial segment is measured to calculate the size of the large-size object. Measuring the size of the spatial segment includes measuring the width and height of the spatial segment. Here, the measuring of the size of the single spatial segment includes measuring the width and height of the single spatial segment to measure the width and height of the large-size object. The measurement of the size of the single spatial segment or the large-size object may be carried out in a predefined unit such as millimeters, inches or other units.

At 904C, different sizes of sheets pre-loaded in the printing device are identified. The identification includes identifying different sizes of sheets and corresponding number of the sheets, pre-loaded in the printing device. At 904D, the measured size of the single spatial segment is compared with the different sizes of the sheets pre-loaded in the printing device. The comparing of the measured size of the single spatial segment with different sizes of sheets pre-loaded in the printing device, includes comparing the width and height of the single spatial segment with the width and height of each available sheet based on the following expression 1:

$$\frac{\text{Width of stock sheet}}{\text{Width of a single spatial segment}} \times \frac{\text{Height of stock sheet}}{\text{Height of single spatial segment}}$$

As an example, the expression is implemented each for the largest size sheets, a second largest size sheets, a smallest size sheets and individual sheets. Referring to FIGS. 2A-2D, the expression 1 is implemented for available sheets in the printing device such as A1, A2, A3, and A4. If the expression 1 is implemented for the largest size sheet A1, then expression 1 identifies how many segments can be mapped using A1 sheet and the same is applicable for all other sheets. Based on the comparison, at 906, one or more of the following ascertainments are performed. At 906A, it is ascertained or determined a number of largest size sheets required to map with a maximum number of spatial segments out of the N×N spatial segments. Then, the number of spatial segments which are left unmapped by the largest size sheets, are identified and accordingly 906B is implemented. At 906B, it is ascertained a number of second largest size sheets required to map on the un-mapped spatial segments. It is further identified and determined the number of spatial segments left unmapped after mapping performed at 906B. At 906C, it is further ascertained a number of the second largest size sheets and smallest size sheets to map on the un-mapped spatial segments. It is again identified if any number of spatial segments are left unmapped after 906C. If yes, the method moves to 906D, it is ascertained a number of individual sheets having size matching to map on the un-mapped spatial segments, when the number of the largest size sheets, the second largest size sheets, and the smallest size sheets fails to map all the un-mapped spatial segments. The individual sheets are considered for mapping when the number of the largest size sheets, the second largest size sheets, and the smallest size sheets fails to map all the un-mapped spatial segments. The block 906D of ascertaining a number of individual sheets having size matching to map on the un-mapped spatial segments is carried out, for spatial segments left un-mapped, by the largest size sheets, the second largest size sheets, and the smallest size sheets. The block 906B is implemented when any number of segments are left unmapped at 906A. Similarly, 906C may be implemented when any number of spatial segments are left unmapped at 906B and 906D may be implemented when any number of spatial segments are left unmapped at 906C. In this way, one or more of the blocks 906A, 906B, 906C and 906 are implemented.

In some implementations, the processing of the large-size object includes geometrical image transformation and rotation of the largest size sheets, the second largest size sheets, the smallest size sheets, or the individual sheets, so as to map all the N×N spatial segments. The geometrical image transformation includes spatial image scaling on the coordinates to align the image morphing and orientation in the processing of the large-size object. The concept of transformation, rotation and morphing are known and thus can be utilized for implementing the present disclosure.

Based on the ascertainment of the number and sizes of the sheets required for printing the large-size object according to 906A-906D, the printing device finally prints the large-size object on multiple sheets at 908. The printing device prints the large-size object on multiple sheets to efficiently use the available sheets with the printing device.

Once the large-size object is printed on multiple sheets, the multiple printed sheets may be pasted together with adhesive. The adhesive may be in the form of tape, paste, spray, or liquid. Tape or adhesive may also be applied to the face of the multiple sheets directly, either on a back surface or on a front surface, so that a secondary surface is not required for assembly of the large-size object. Alternately, double-sided tape may be applied to a back side of a sheet, either by the printer manufacturer or by the user, so as to assemble the large-size object.

Thus, with the implementation of the methods 700, 800 and 900 of the present subject matter, the user is able to print a large-size object, such as a poster, banner, or dust jacket, on available multiple sheets of small size printers, typically used in home and business offices. Also, the present subject matter considers all the geometric transformations (rotation, portrait, landscape, and translation) into consideration which act as an effective medium to split the object into various smaller spatial segments. This is taken into effect to further efficiently select the sheets to be used for the task printing and to reduce unwanted wastage of the resource available.

The present disclosure is discussed where a print job includes one large-size object. But it is understood the print job may include multiple large-size objects and the present disclosure can handle such multiple large-size objects in the same manner as discussed above.

The present disclosure tackle scenarios where the printing devices may be smaller printing devices having limited sheets sizes but allows printing of large-size objects. The large-size objects are printed using sheets of various sizes that the printing device supports but based on the availability of the sheets with the printing device.

Implementing the present disclosure allows the user to print any size objects such as large size objects using small printing devices that are generally available in offices, homes and so on. The disclosure further allows mixing dimensions and rotations of sheets to waste the least number of sheets.

Any object is considered a large size object when the size of the object is larger than the largest size sheet available in a printing device. In such cases the printing device may be termed as a small printing device or a standard printing device. The large-size object may vary depending on the type of printing device and/or depending on the availability of the sheets in the printing device. Any object which is implemented in accordance with the present disclosure is considered as a large-size object.

It can be considered that sheets sizes and tray sizes are defined with the printing device. And the printing deice by default recognizes all tray sizes and sheet sizes.

The present disclosure uses the best possible combination of sheets to print the large-size object. The disclosure may be extended to do foldable jobs as well. The disclosure may be extended to small size objects, i.e., when size of an object is smaller than available sheets in the printing device.

The present disclosure discloses methods and systems for handling printing of large-size objects by a smaller printing device. The methods and systems automatically split or divide the large size object into smaller segments based on the available sheets in the device. The large-size objects are printed using the best possible combination of multiple sheets available in the printing device without any wastage, thereby efficiently and effectively using sheets available with the printing device. The large size objects are printed without scaling the objects instead transformation and rotation of images may be performed to fit into the sheets available with the printing device. The printing device makes best judgement to leverage the available sheets and makes best use of sheets without wasting it.

Further, the present subject matter is disclosed herein with reference to a server-client architecture; however, the subject matter is equally applicable to printing systems implemented in multi-functional devices, such as printers, copiers, and the like, which are in direct communication with the user devices.

The present disclosure may be executed by a printing device or any of its components such as a processing resource, processor, a raster image processor and so on.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of the manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the disclosure, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "processing," or "dividing," or "printing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for handling printing of a large-size object at a printing device, the method comprising:
    receiving, at the printing device, a print job comprising a large-size object;
    processing, by the printing device, the large-size object to ascertain sizes of sheets and the corresponding number of the sheets required for printing the large-size object, wherein the processing comprising:
        dividing the large-size object into N×N spatial segments of equal size, wherein N is numeric value equal to or greater than 8, the size of the spatial segments dependent on the size of the large-size object;
        measuring the size of a single spatial segment;
        identifying different sizes of sheets pre-loaded in the printing device; and
        comparing the measured size of the single spatial segment with different sizes of sheets pre-loaded in the printing device, wherein the comparing the measured size of the single spatial segment with the different sizes of sheets pre-loaded in the printing device comprises comparing the width and height of the single spatial segment with the width and height of each available sheet based on the following expression:

$$\frac{\text{Width of stock sheet}}{\text{Width of a single spatial segment}} \times \frac{\text{Height of stock sheet}}{\text{Height of single spatial segment}};$$

based on the comparison, ascertaining a number of largest size sheets that map with a maximum number of spatial segments out of the N×N spatial segments;

for un-mapped spatial segments, performing one or more of the following:
  ascertaining a number of second largest size sheets to map on un-mapped spatial segments, or
  ascertaining a number of the second largest size sheets and smallest size sheets, to map on the un-mapped spatial segments, or
  ascertaining a number of individual sheets having size matching to map on the un-mapped spatial segments, when the number of the largest size sheets, the second largest size sheets, and the smallest size sheets fails to map all the un-mapped spatial segments; and printing, by the printing device, the large-size object on multiple sheets based on the ascertainment, without scaling the large-size object.

2. The method of claim 1, wherein the measuring the size of the single spatial segment comprising measuring the width and height of the single spatial segment.

3. The method of claim 1, wherein the print job comprising an instruction to print the large-size object in a large format printing mode.

4. The method of claim 1, wherein the size of each spatial segment is variable and is dependent on the size of the large-size object.

5. The method of claim 1, wherein the further ascertaining a number of individual sheets having size matching to map on the un-mapped spatial segments are carried out, for spatial segments, left un-mapped by the largest size sheets, the second largest size sheets, and the smallest size sheets.

6. The method of claim 1, wherein after measuring the size of a single spatial segment, the method comprising ascertaining the number and sizes of different sheets pre-loaded in the printing device.

7. The method of claim 1, wherein the processing of the large-size object comprising geometrical image transformation and rotation of the largest size sheets, the second largest size sheets, the smallest size sheets, or the individual sheets, so as to map all the N×N spatial segments.

8. The method of claim 7, wherein the geometrical image transformation comprises spatial image scaling on the coordinates to align the image morphing and orientation in the processing of the large-size object.

9. The method of claim 1 is implemented in the form of a non-transitory computer-readable medium comprising instructions executable by a processing resource.

10. A method, comprising:
  receiving a print job at a printing device, the print job comprising an object;
  measuring the size of the object;
  automatically identifying, by the printing device, pre-loaded sheets in the printing device;
  automatically determining, by the printing device, whether the object is a large-size object based on the pre-loaded sheets in the printing device;
  processing the large-size object in the following manner:
    dividing the large-size object into N×N spatial segments of equal size, the size of the spatial segments dependent on the size of the large-size object;
    comparing the measured size of the single spatial segment with different sizes of sheets pre-loaded in the printing device;
    based on the comparison,
      calculating the number of spatial segments to be printed on a single largest size sheet and the number of the largest size sheets required to print the maximum number of spatial segments;
      identifying the remaining spatial segments of the large-size object; and
      identifying the number of other loaded sheets required to print the remaining spatial segments of the large-size object; and
    based on the calculation and identification, printing the complete large-size object on multiple sheets pre-loaded in the printing device, without scaling the large-size object.

11. The method of claim 10, wherein identifying the pre-loaded sheets comprises:
  identifying different types of sheets; and
  further segregating the sheets as largest size sheets, second largest size sheets, smallest size sheets and individual sheets.

12. The method of claim 10, wherein identifying the number of other loaded sheets required to print the remaining spatial segments of the large-size object comprises:
  ascertaining a number of second largest size sheets to map on the remaining spatial segments, or
  ascertaining a number of the second largest size sheets and smallest size sheets, to map on the remaining spatial segments, or
  ascertaining a number of individual sheets having size matching to map on the remaining spatial segments, when the number of the largest size sheets, the second largest size sheets, and the smallest size sheets fails to map all the remaining spatial segments.

13. The method of claim 10, wherein the further ascertaining a number of individual sheets having size matching to map on the remaining spatial segments are carried out, for the spatial segments remained unmapped, by the largest size sheets, the second largest size sheets, and the smallest size sheets.

14. A printing device for printing a large-size object on multiple sheets, the printing device comprising a processor to:
  receive a print job submitted by a user, wherein the print job comprising an instruction to print the large-size object in a large format printing mode;
  divide the large-size object into N×N spatial segments of equal size, wherein N is numeric value equal to or more than 8, the size of the spatial segments dependent on the size of the large-size object;
  measure the size of a single spatial segment to calculate the size of the large-size object;
  compare the measured size of the single spatial segment with different sizes of sheets pre-loaded in the printing device, wherein comparing the measured size of the single spatial segment with different sizes of sheets pre-loaded in the printing device comprises comparing the width and height of the single spatial segment with the width and height of each available sheet based on the following expression:

$$\frac{\text{Width of stock sheet}}{\text{Width of a single spatial segment}} \times \frac{\text{Height of stock sheet}}{\text{Height of single spatial segment}}$$

based on the comparison, ascertain a number of largest size sheets that map with a maximum number of spatial segments out of the N×N spatial segments and for un-mapped spatial segments, ascertain one or more of the following:
- a number of second largest size sheets to map on un-mapped spatial segments, or
- a number of the second largest size sheets and smallest size sheets, to map on un-mapped spatial segments, or
- a number of individual sheets having size matching to map on the un-mapped spatial segments, when the number of the second largest size sheets and the smallest size sheets fails to map all the un-mapped spatial segments; and print the large-size object on multiple sheets based on the ascertainment, without scaling the large-size object.

15. The printing device of claim 14, wherein the size of each spatial segment is variable and is dependent on the size of the large-size object.

16. The printing device of claim 14, wherein the processor is to further ascertain a number of individual sheets having size matching to map on the un-mapped spatial segments, for spatial segments left un-unmapped, by the largest size sheets, the second largest size sheets, and the smallest size sheets.

17. The printing device of claim 14, wherein after measurement of the size of the single spatial segment, the processor is to ascertain the number and sizes of sheets pre-loaded in the printing device.

18. The printing device of claim 14, wherein the processor is to further identify pre-loaded sheets in the printing device.

* * * * *